Dec. 17, 1957 F. C. KUCHAS ET AL 2,816,965

SERVICE OBSERVING CIRCUITS

Filed March 27, 1956 14 Sheets-Sheet 1

INVENTORS F. C. KUCHAS
V. E. ROSENE

BY C. Mathis

ATTORNEY

SERVICE OBSERVING CIRCUITS

Filed March 27, 1956 14 Sheets-Sheet 2

INVENTORS F. C. KUCHAS
V. E. ROSENE
BY C. Mattice
ATTORNEY

Dec. 17, 1957 F. C. KUCHAS ET AL 2,816,965

SERVICE OBSERVING CIRCUITS

Filed March 27, 1956 14 Sheets-Sheet 3

INVENTORS F. C. KUCHAS
V. E. ROSENE

BY C. Mattice

ATTORNEY

INVENTORS F. C. KUCHAS
V. E. ROSENE
BY C. Mattice
ATTORNEY

Dec. 17, 1957 F. C. KUCHAS ET AL 2,816,965

SERVICE OBSERVING CIRCUITS

Filed March 27, 1956 14 Sheets-Sheet 5

INVENTORS F. C. KUCHAS
V. E. ROSENE

BY C. Mattice

ATTORNEY

Dec. 17, 1957    F. C. KUCHAS ET AL    2,816,965

SERVICE OBSERVING CIRCUITS

Filed March 27, 1956    14 Sheets-Sheet 6

INVENTORS F. C. KUCHAS
V. E. ROSENE
BY C. Mathee
ATTORNEY

INVENTORS F. C. KUCHAS
V. E. ROSENE
BY C. Mathie
ATTORNEY

INVENTORS F. C. KUCHAS
V. E. ROSENE
BY C. Mattice
ATTORNEY

INVENTORS F. C. KUCHAS
V. E. ROSENE

BY C. Mattice

ATTORNEY

Dec. 17, 1957 F. C. KUCHAS ET AL 2,816,965

SERVICE OBSERVING CIRCUITS

Filed March 27, 1956 14 Sheets-Sheet 10

INVENTORS F. C. KUCHAS
V. E. ROSENE
BY C. Mattice
ATTORNEY

Dec. 17, 1957 F. C. KUCHAS ET AL 2,816,965

SERVICE OBSERVING CIRCUITS

Filed March 27, 1956 14 Sheets-Sheet 11

INVENTORS F. C. KUCHAS
V. E. ROSENE
BY C. Mathie
ATTORNEY

Dec. 17, 1957 F. C. KUCHAS ET AL 2,816,965

SERVICE OBSERVING CIRCUITS

Filed March 27, 1956 14 Sheets-Sheet 12

INVENTORS F. C. KUCHAS
V. E. ROSENE

BY C. Mattice

ATTORNEY

Dec. 17, 1957 F. C. KUCHAS ET AL 2,816,965

SERVICE OBSERVING CIRCUITS

Filed March 27, 1956 14 Sheets-Sheet 13

INVENTORS F. C. KUCHAS
V. E. ROSENE

BY C. Mathie

ATTORNEY

INVENTORS F. C. KUCHAS
V. E. ROSENE
BY C. Mathias
ATTORNEY

United States Patent Office 2,816,965

Patented Dec. 17, 1957

2,816,965

SERVICE OBSERVING CIRCUITS

Francis C. Kuchas, Manhasset, and Victor E. Rosene, Queens Village, N. Y., assignors to Bell Telephone Laboratories, Incorporated, New York, N. Y., a corporation of New York Application March 27, 1956, Serial No. 574,268

17 Claims. (Cl. 179—175.2)

This invention relates to telephone systems and has for its object to improve telephone service by facilitating the observation of such service.

Service observing on subscriber lines appearing both in manual and dial telephone exchanges has long been practice. With the advent of toll switching, special means was required for observing on the trunks and cord circuits used with such systems and one such arrangement is disclosed in V. E. Rosene's prior Patent 2,709,722, January 31, 1955.

A new field for service observing arises when subscribers dial their own long distance calls and switching and charging means are partly or wholly automatic. The charging equipment may be located at the office which serves the calling line. Such equipment is known as automatic message accounting equipment, usually abbreviated to AMA. On the other hand, the charging equipment may be located at a central point serving a number of outlying offices, in which the equipment is known as centralized automatic message accounting equipment, usually abbreviated to CAMA. A certain number of long distance calls would be observed while observing on the subscribers' lines but the relative number of such calls to local calls is so small that an excessive amount of observation would be necessary in order to collect a significant amount of data relating to long distance calls. It therefore becomes desirable to observe on the trunk circuits carrying long distance calls.

One type of telephone office provided with charging equipment for local subscribers is shown in Patent 2,585,904 to A. J. Busch, February 19, 1952, the charging equipment being disclosed in more detail in Patent 2,599,353 to H. D. Cahill, W. W. Carpenter, and T. L. Dimond, June 3, 1952. An arrangement by which an office operates charging equipment for subscribers at auxiliary offices is shown in the application of Breed-Cesareo-Germanton-Roberts-Weber-Wingardner, Serial No. 463,102, filed October 19, 1954. The present invention is designed to serve an office of the type shown in the Busch and Cahill et al. patents modified to also provide centralized charging as disclosed in the application of Breed et al. In this type of office, connections are set up under the control of a common control circuit known as a marker. When a call is to be set up a marker is seized and the identity and class of the calling line and the called line or trunk is registered therein. To obtain access to trunks, connectors known as trunk link connectors are operated.

The service observing equipment of the present arrangement is also provided with a trunk connector and the trunk circuits on which observations are to be made are wired permanently to the service observing connector.

In accordance with one feature of the invention, the service observing operator sets up a class indication in the service observing connector of the class of trunk on which observations are to be made and this class indication is extended to all markers. When a marker is called in to set up a connection, it checks the class of the trunk to be used in that connection against the class indication received from the observing connector and if they are the same, renders the service observing equipment effective to extend the trunk to the service observing desk.

Another feature of the invention lies in means effective if the class indications match for causing the marker to transmit the called line designation to a register circuit which later controls the transmission of this number to the observing operator.

A further feature of the invention includes means for preventing the release of equipment reached over the outgoing trunk after the calling subscriber disconnects, to give the service observing operator an opportunity to identify toll line signals which may occur.

These and other features of the invention will be more clearly understood from a consideration of the following description read in connection with the drawings in which.

Figures 4, 15:
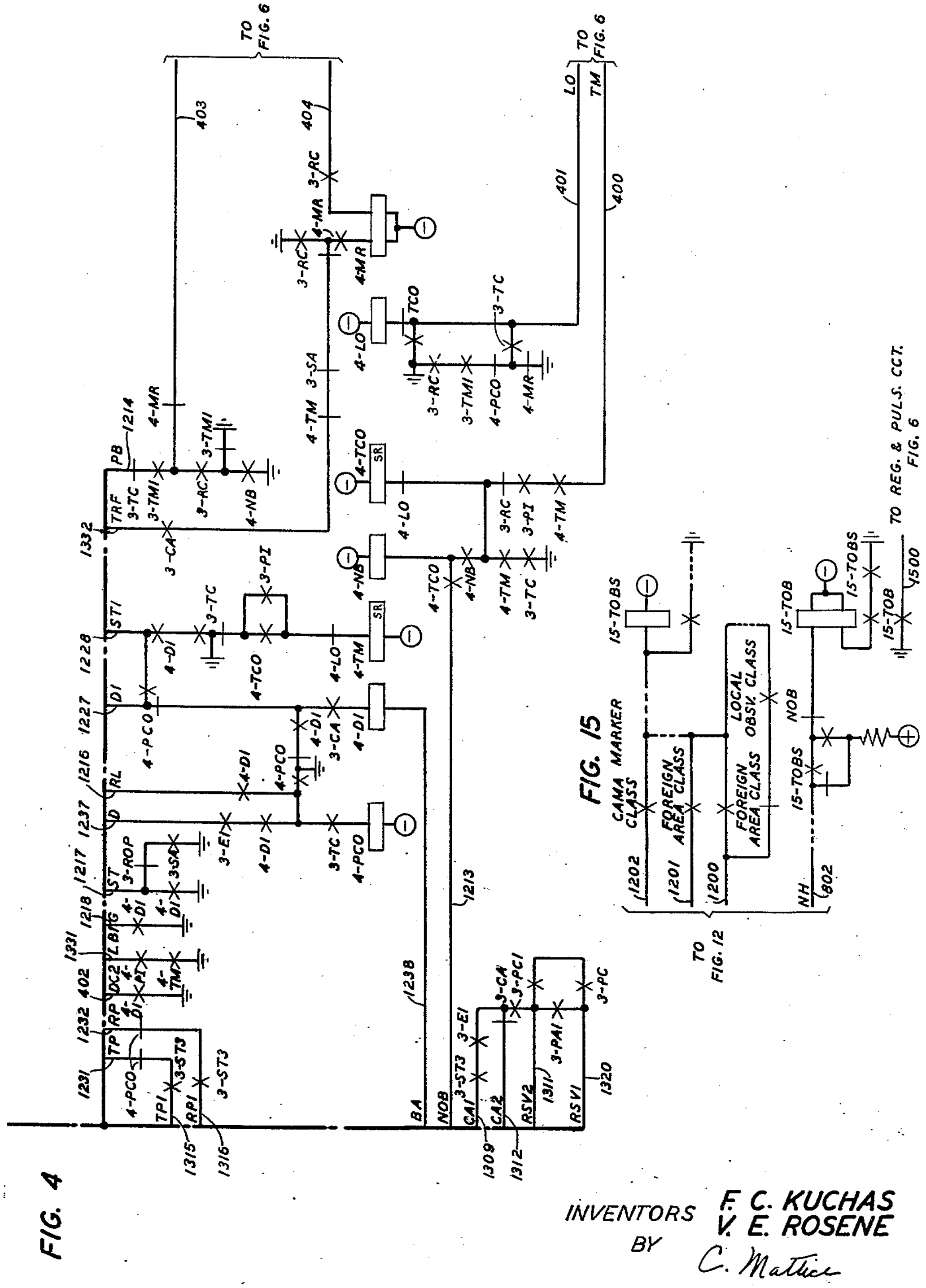
Figure 5:
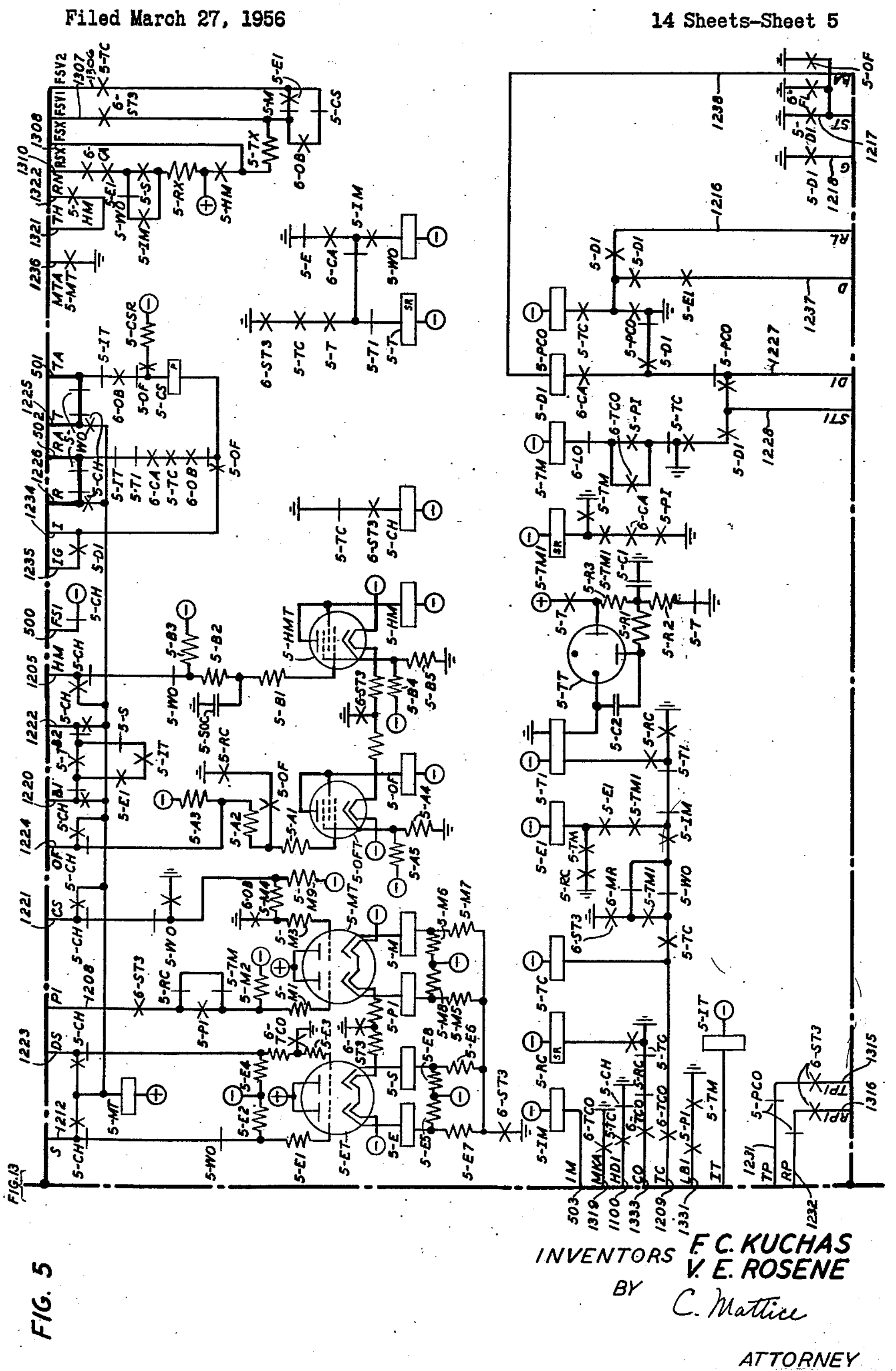
Figs. 5 and 6 show the observing circuit for observing on AMA trunks such as that of Fig. 7.
Figure 8:
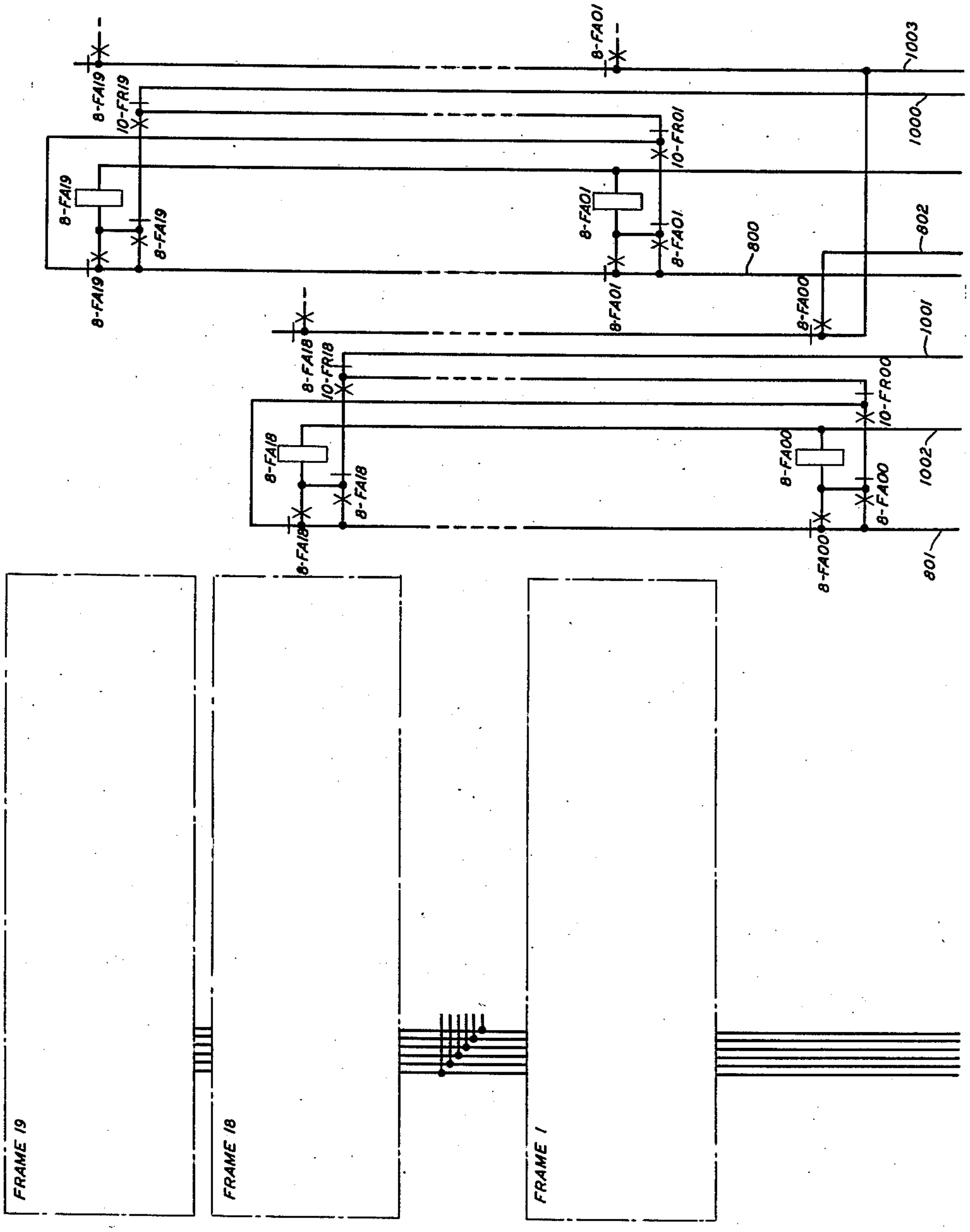
Figure 9:
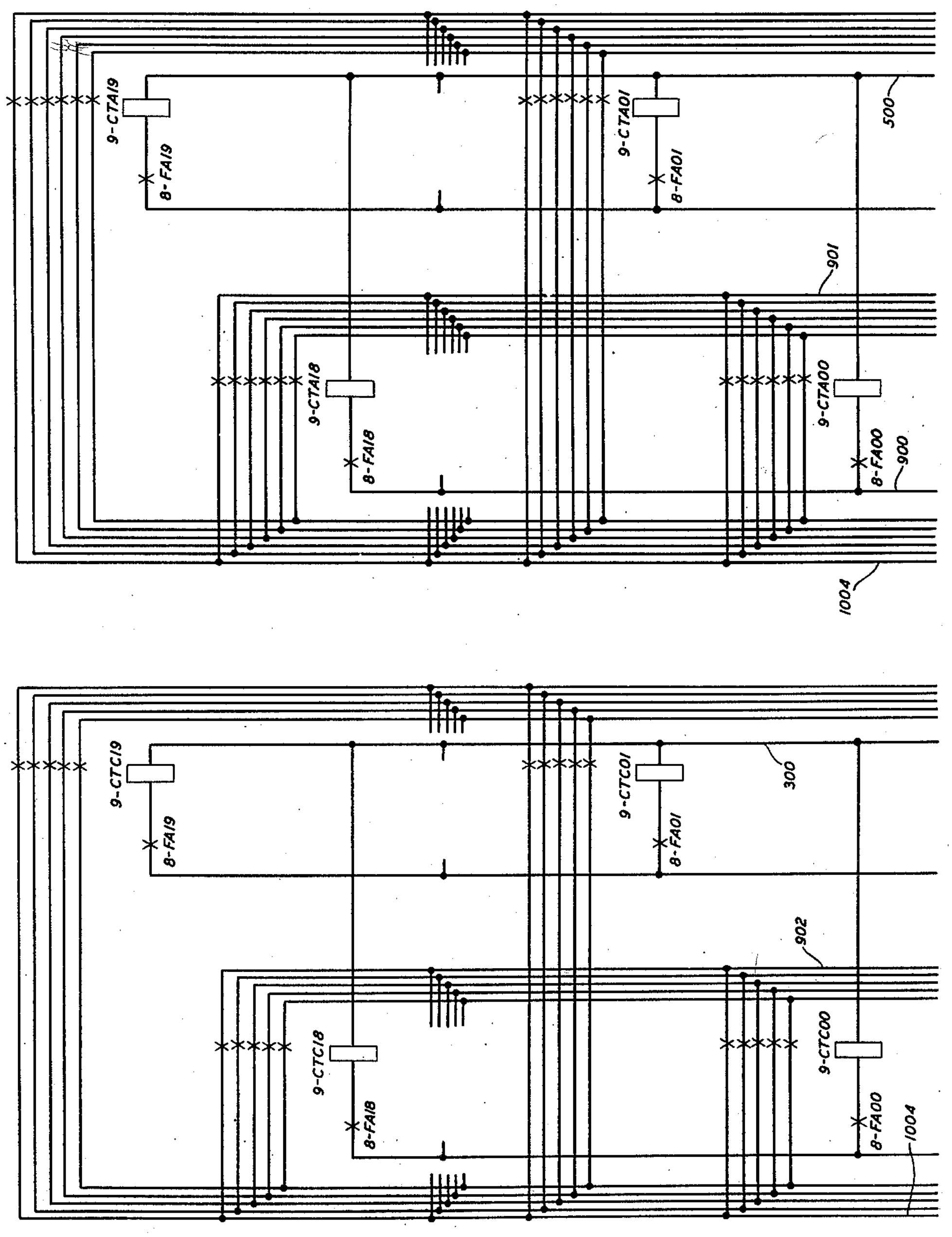
Figure 10:
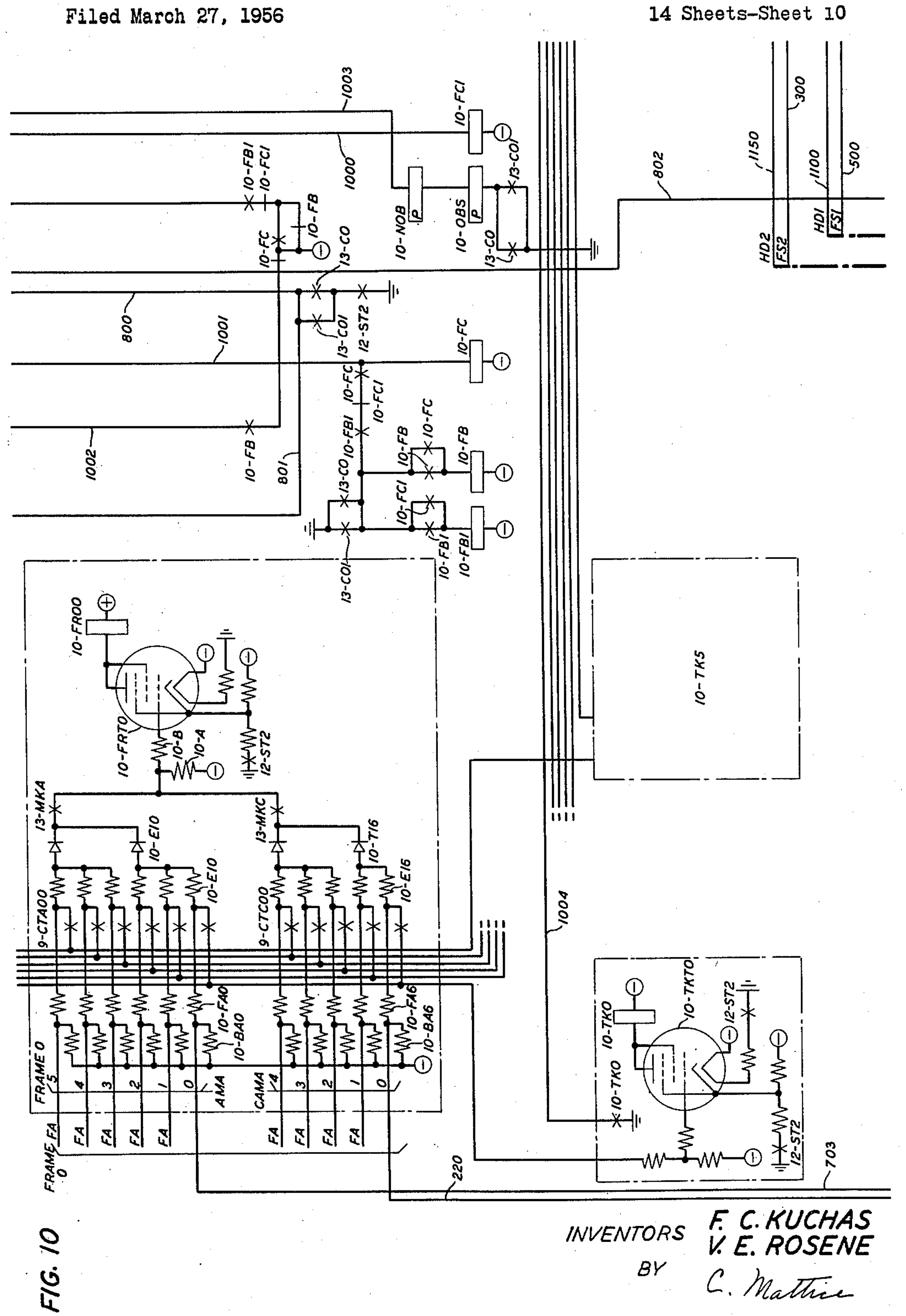
Figure 11:
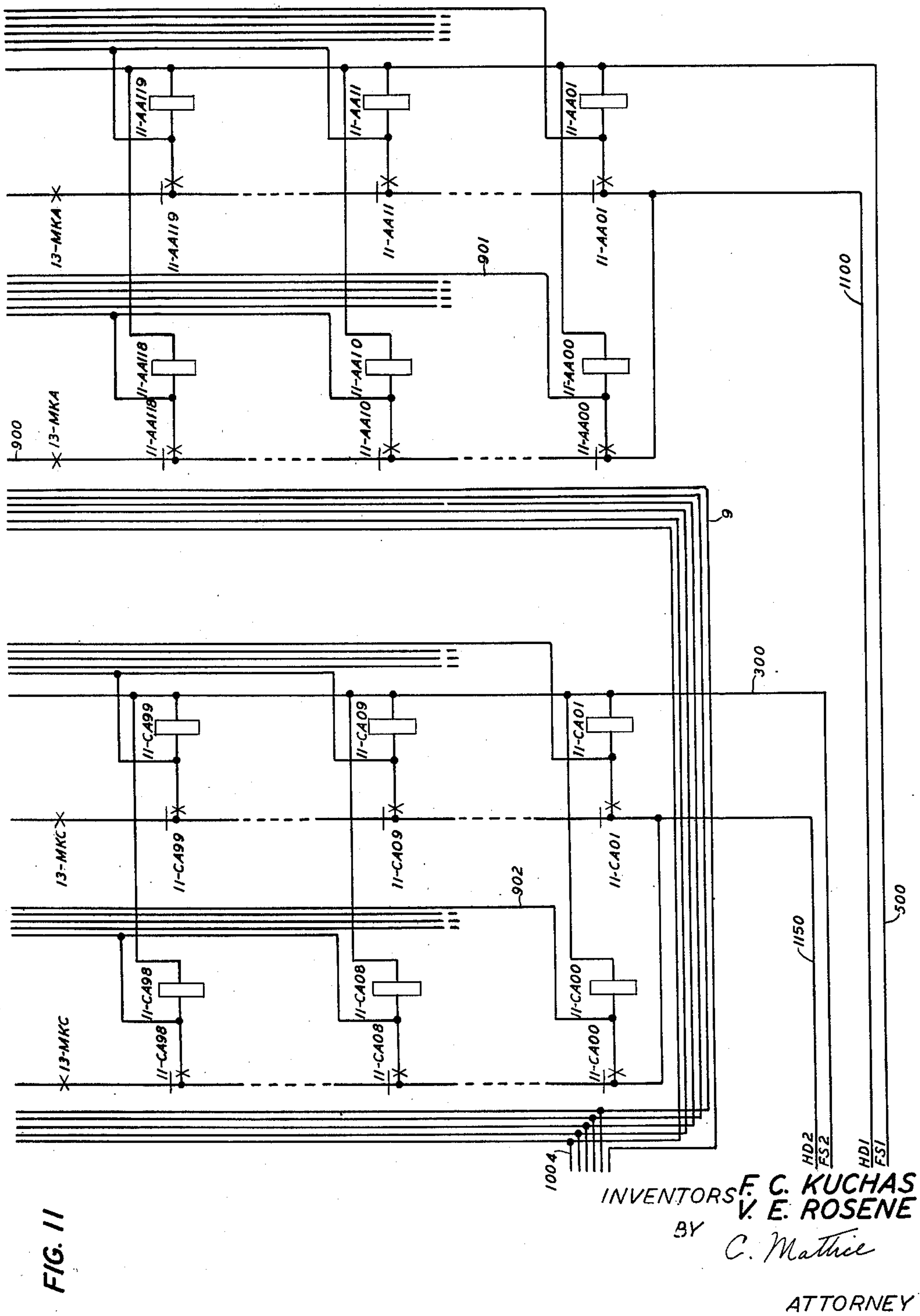
Figure 12:
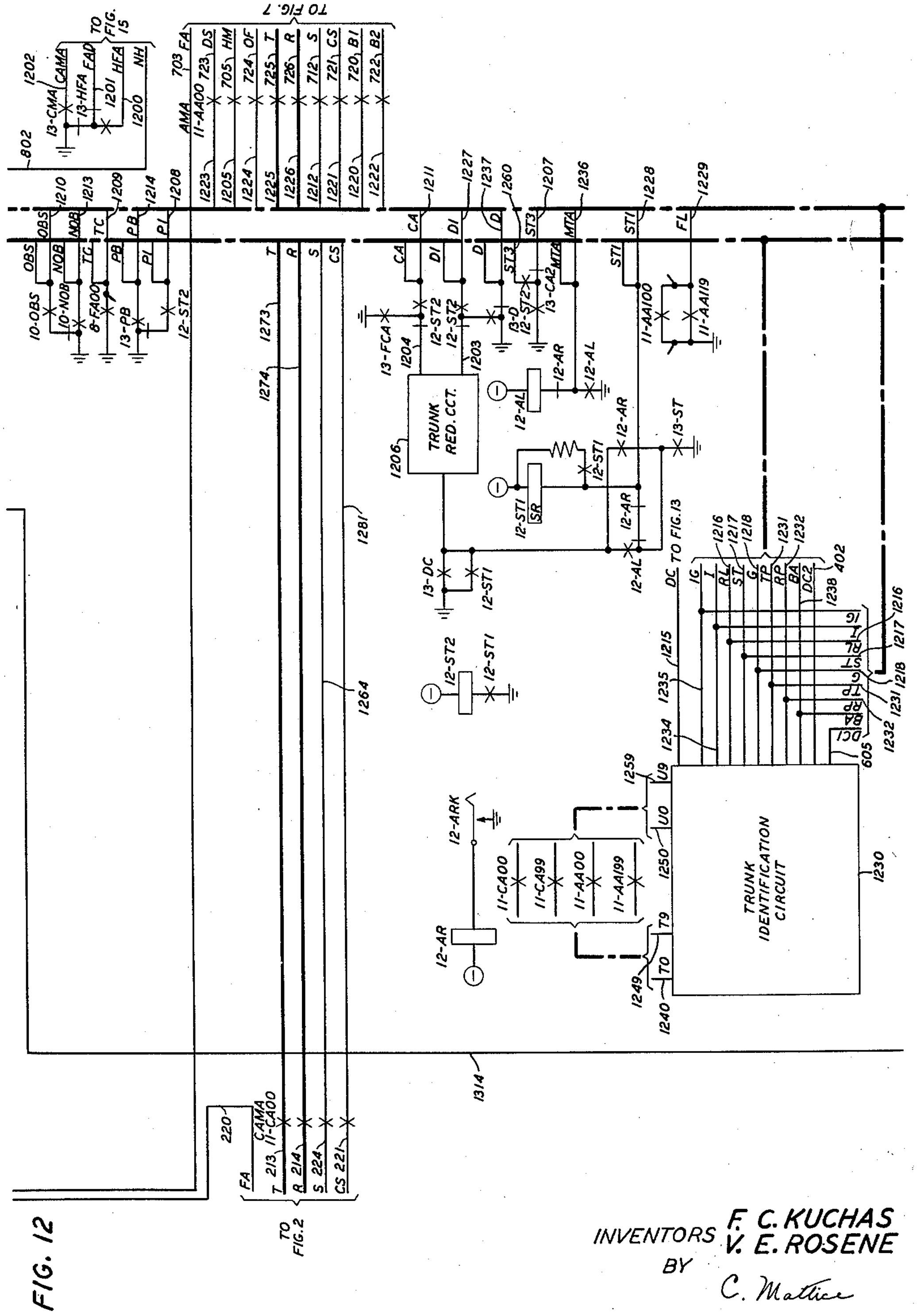
Figure 13:
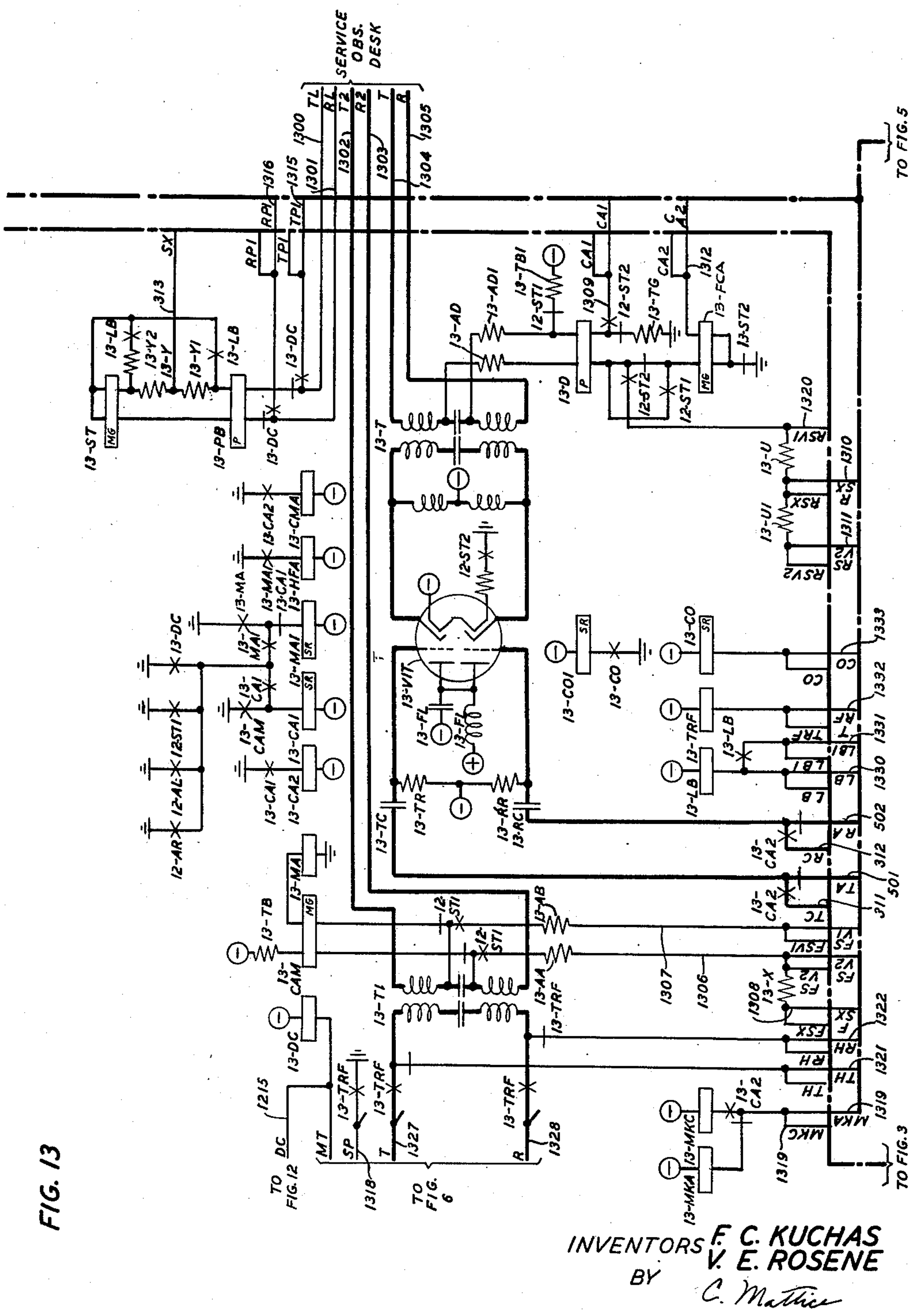

Figs. 8 to 13 shows the service observing connector, Fig. 8 showing a plurality of trunk frames, Fig. 9 showing frame connecting relays, Fig. 10 showing the frame selecting and trunk selecting equipment, Fig. 11 showing the trunk connecting relays, Fig. 12 showing a part of the service observing trunk and associated trunk reduction and trunk identification circuits, Fig. 13 showing the remainder of the service observing trunk;

Fig. 15 which appears on the same sheet as Fig. 4 shows a part of a marker; and

Figure 14:
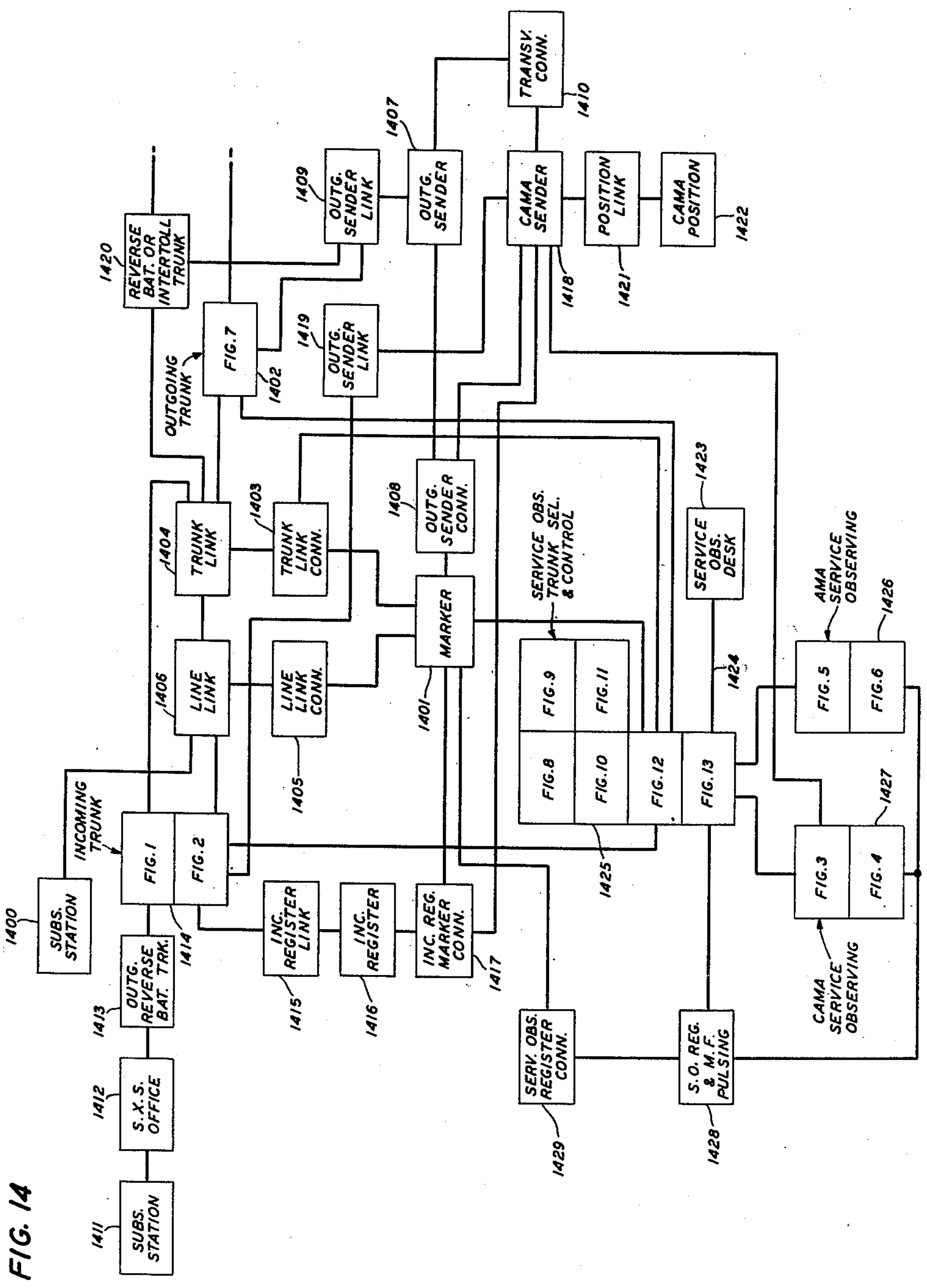

Fig. 14 shows the complete service observing arrangement in diagrammatic form with the location of Figs. 1 to 13 indicated thereon.

In the drawing the relay contacts are shown detached from the relay windings, the relay windings are given letter designations, prefixed by the number of the figure in which the winding appears and the relay contacts are identified by corresponding designations. Contacts which are closed when the relay is deenergized are represented by a single short line perpendicular to the lines representing the connecting conductors while contacts which are closed when the relay is operated are represented by a cross or an X at the junction of the connecting conductors.

A brief description will first be given of the general operation of a telephone office of the type to which the service observing arrangement applies. Such an office may establish local calls, outgoing calls to local offices and incoming calls from other offices. In addition, it may serve as a tandem point connecting an incoming trunk from one office with an outgoing trunk to a third office.

Referring to Fig. 14, when a call originated at the local subscriber substation 1400, which is to be extended to a distant office, the designation of the wanted line together with the identification of the calling line is registered in the marker 1401. The manner in which this takes place is completely described in the above-identified Busch patent. The marker then selects a trunk link frame such as frame 1404 having an idle outgoing trunk such as trunk 1402 and operates the trunk link connector 1403 having access to the selected trunk link frame 1404, after which the marker selects and connects with the idle trunk 1402. The marker then operates line link connector 1405 having access to the line link frame 1406 at which the calling line 1400 appears, tests for an idle channel over which line 1400 may be connected to trunk 1402 and completes a connection between the line and the trunk. While the marker is selecting an idle trunk it also selects an idle outgoing sender such as sender 1407, operates the outgoing sender connector 1408, transmits the calling line identity and the called line designation to the outgoing sender and operates the the outgoing sender link 1409 to connect sender 1407 with trunk 1402. When this connection has been completed and the marker has checked that all of the necessary information has been passed to the sender, the marker operates an advance relay in the sender and releases. The outgoing sender 1407 then operates the transverter connector 1410 to initiate the initial entry by the charging equipment. This equipment is the same as that disclosed in the above-identified Cahill et al. patent and has therefore not been shown. The outgoing sender 1409 controls the completion of the connection and then releases.

If a call is originated at substation 1411 appearing at an auxiliary office such as the step-by-step office 1412, either for a subscriber at the main office such as the subscriber at substation 1400 or for a subscriber at some other auxiliary office reached through the main office, the substation 1411 will be extended through the office 1412 and an outgoing trunk 1413 at that office to an incoming trunk at the main office such as trunk 1414. When trunk 1414 is seized it operates the incoming register link 1415 to connect with an idle incoming register such as register 1416. The designation of the wanted subscriber is transmitted from the auxiliary office 1412 to the incoming register 1416. When the registration has been received, register 1416 operates the incoming register marker connector 1417 to connect with an idle marker 1401. As soon as the marker is seized by an incoming register, it operates the sender connector 1408 to select an outgoing sender equipped for CAMA, such as sender 1418, and passes to it the identity of the incoming trunk and the designation of the wanted line. The marker also connects sender 1418 through the outgoing sender link 1419 with the incoming trunk 1414. In addition, the marker operates switches on the line link frame 1406 and the trunk link frame 1404 to connect the incoming trunk either with a substation such as substation 1400, using the trunk link appearance of the incoming trunk 1414, or with the outgoing trunk 1420, using the line link appearance of the incoming trunk 1414, according to the designation registered therein. When the marker indicates to the sender 1418 that it is ready to release, the sender 1418 is connected through the outgoing sender link 1419 and the trunk 1414 with the calling substation. The sender 1418 operates position link 1421 to select an operator at the centralized operator's position 1422. The operator then asks the calling subscriber for his designation and registers the number in the sender 1418 by operating a key set at her position. The sender 1418 then operates the transverter connector 1410 to cause the proper charging entry to be made. If the call is for substation 1400, the sender 1418 now releases. If the call is for a subscriber reached over trunk 1420, the sender 1418 transmits all or a part of the designation to the distant office and then releases.

Service observing desk 1423 may be located at the main office or may be located at some other office. The desk 1423 is connected with the service observing circuits by means of the trunk 1424 including three pairs of conductors over which signaling and monitoring may take place. This desk is essentially the same as that disclosed in the above-identified Rosene patent. The desk may observe on either locally originated calls or on calls originated at an auxiliary office but can observe on only one type of call at a time. Means are provided at the desk 1423 to indicate to the control circuit 1425 what type of calls are to be observed and whether there is a position at the desk waiting for a call. According to the type of call to be observed, the control circuit 1425 renders either the local observing circuit (AMA) 1426 or the centralized observing circuit (CAMA) 1427 effective. It also indicates to all markers what observations are being made and directs the connection of trunks of the proper type to the effective service observing circuit. The called number is obtained from the marker which is connected to the service observing register 1428 by means of the service observing register connector 1429 under the control of either service observing circuit when a call is to be observed. Later the register 1428 transmits the number to the desk 1423.

OPERATION OF TRUNK CIRCUITS

*CAMA trunk*

Figure 1:
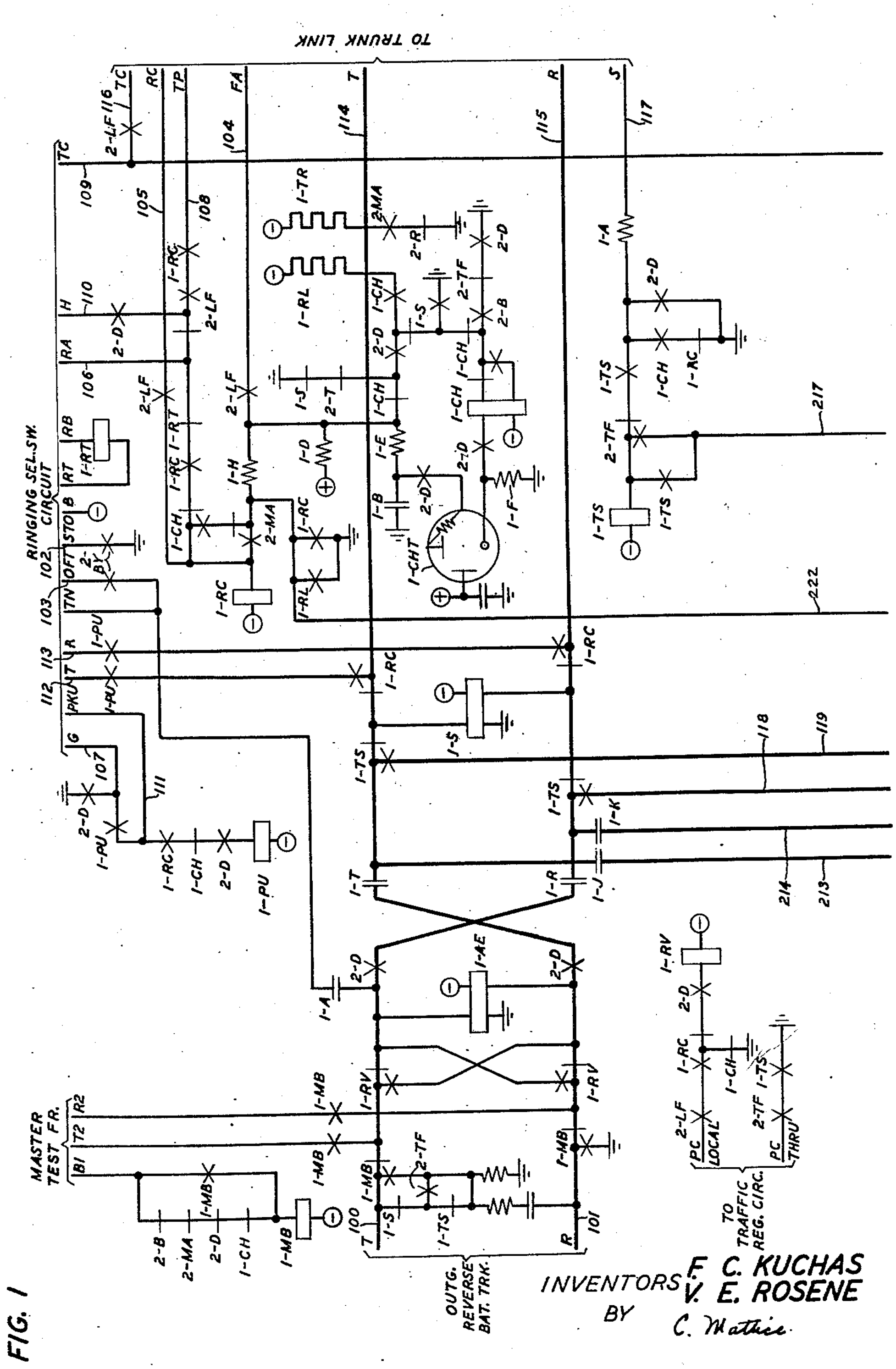
Figs. 1 and 2 show an incoming CAMA trunk, Fig. 1 showing the trunk link termination and Fig. 2 showing the line link termination.
Figure 2:
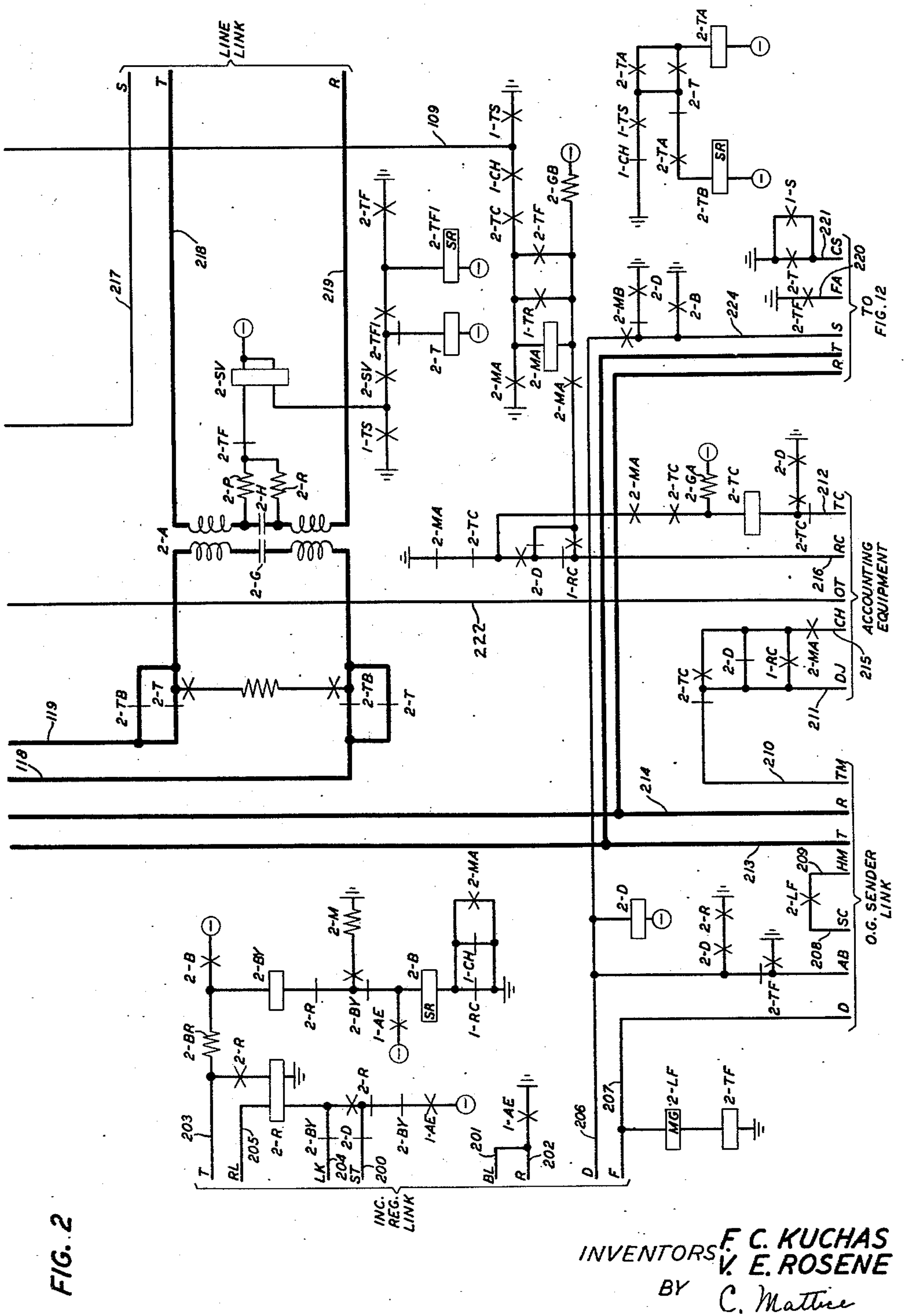
Figure 3:
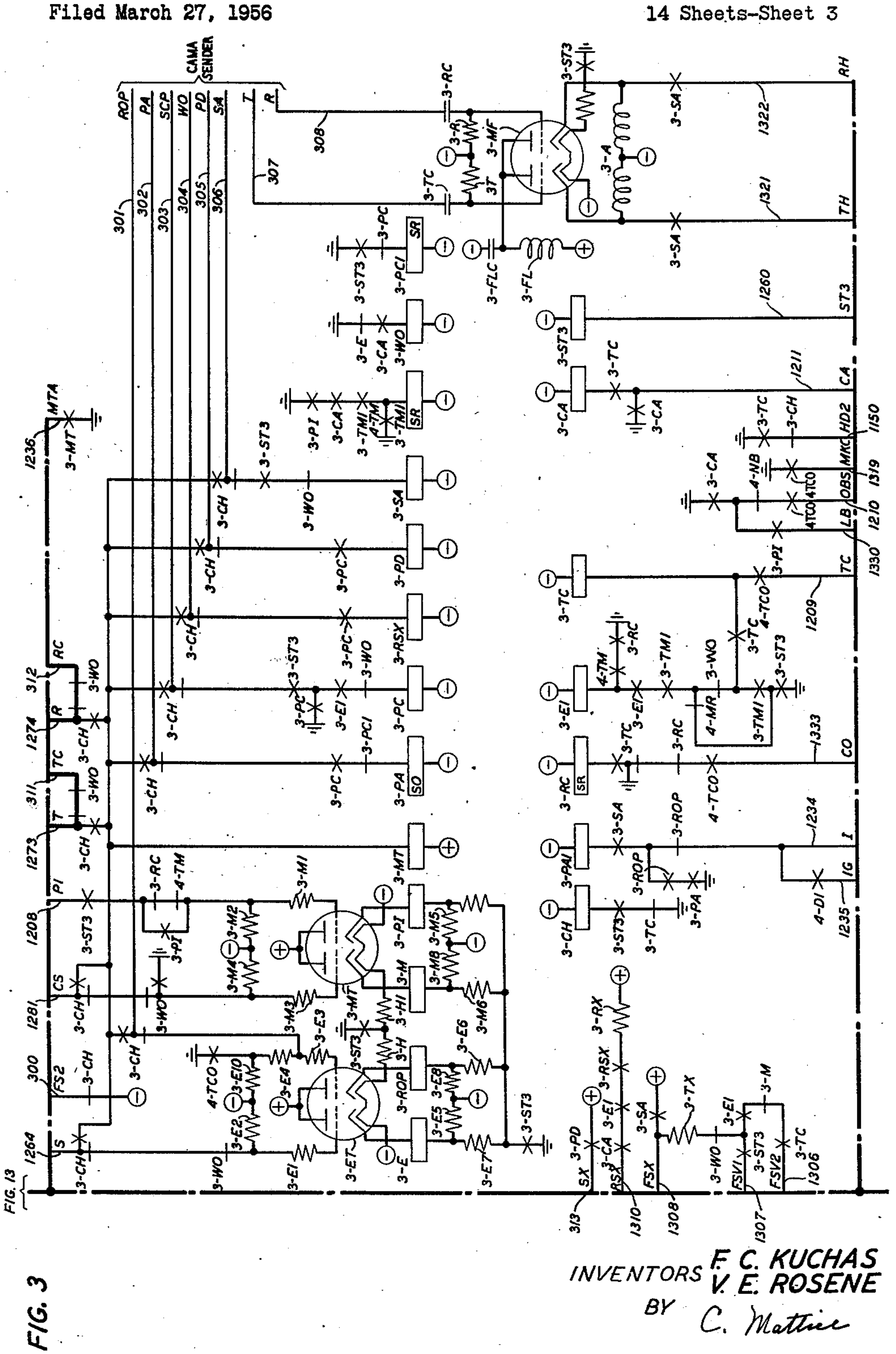
Figs. 3 and 4 show the observing circuit for observing on CAMA trunks such as the trunk of Figs. 1 and 2.

When the incoming trunk circuit of Figs. 1 and 2 is seized at the distant office, a loop circuit is closed which may be traced from ground through the left winding of relay 1–AE, back contacts of relay 1–RV and 1–MB, tip conductor 100 of the incoming trunk, loop circuit at the originating office, ring conductor 101, back contacts of relays 1–MB and 1–RV to battery through the right winding of relay 1–AE. Relay 1–AE operates in this circuit and closes a circuit from battery, front contact of relay 1–AE, winding of relay 2–B to ground over the back contact of relay 1–RC or the back contact of relay 1–CH. It also closes a circuit from battery over the front contact of relay 1–AE, back contacts of relays 2–BY, 2–R and 2–D to the start conductor 200 of the incoming register link to initiate the connection of the trunk circuit with an incoming register. Relay 1–AE also connects ground over its front contact to conductors 201 and 202 to prepare for transmitting the designation as received from the calling office to the sender, conductor 201 extending over a temporary by-link and conductor 202 forming one side of the usual pulsing circuit which extends through the link switch when the link operation is completed.

Relay 2–B connects battery over a front contact of relay 2–B through the resistor 2–BR to conductor 203 forming the other side of the pulsing circuit. Relay 2–B also connects ground to conductor 224 leading towards the service observing control circuit, the purpose of which will appear hereinafter.

As soon as the by-link is closed, the link circuit connects battery to conductor 204 and ground to conductor 205, completing a circuit through the left winding of relay 2–R over a back contact of relay 2–BY, operating relay 2–R. Relay 2–R closes a holding circuit for itself from ground through its right winding to battery over conductor 203. With relay 2–R operated, the start conductor 200 is connected over a back contact of relay 2–D, front contact of relay 2–R, and back contact of relay 2–BY to battery over conductor 204 and is disconnected from the battery supplied as previously traced over the front contact of relay 1–AE. When the link switch has operated, conductors 202, 203, 206 and 207 are connected directly to the selected incoming register. Relay 1–AE responds to the digits pulsed over the incoming trunk and repeats the pulses over conductor 201 or conductor 202 to the incoming register.

When the register has received the complete designation, it connects ground to conductor 206, completing a circuit for operating relay 2–D which connects the incoming conductors 100 and 101 through to the talking condensers 1–T and 1–R. Relay 2–D closes a locking circuit for itself over front contacts of relays 2–D and 2–R. When relay 2–D operates, it closes a circuit from ground over a back contact of relay 1–CH, back contact of relay 1–RC, front contact of relay 2–D to battery through the winding of relay 1–RV. Relay 1–RV, in operating, reverses the connection of battery and ground to conductors 100 and 101 which would serve as a start-dial signal if the trunk had been seized by an operator or a distant sender.

With relay 2–D operated, ground is connected through resistor 1–A to conductor 117 to supply ground for holding the switches to be included in the connection. Relay 2–D also prepares a number of other circuits which will be traced when they are completed.

After the incoming register has received the designation, it calls in a marker to which it passes the called line designation, and the marker determines from the designation whether a local subscriber or a distant subscriber is wanted and recognizes that the call is one requiring message billing. The marker therefore selects a special sender equipped for message accounting, prepares the outgoing sender link, and connects battery to conductor 207 operating relays 2–LF and 2–TF. Relay 2–LF connects conductors 208 and 209 together to operate the hold magnet individual to the trunk in the sender link, the hold magnet remaining operated under the control of the special sender. The marker passes the called line designation to the special sender and disconnects. The special sender calls in an operator whose position is connected over conductors 213 and 214, condensers 1–J and 1–K, condensers 1–T and 1–R, front contacts of relay 2–D, front contacts of relay 1–RV, and back contacts of relay 1–MB to conductors 100 and 101 and thence to the calling line. The calling subscriber is asked for his line designation and the operator registers the number given in the special sender.

The special sender then connects ground to conductor 210, completing a circuit over a back contact of relay 2–TC to conductor 211 to cause the accounting equipment to make the initial entry. When the initial entry has been completed, the accounting equipment connects ground to conductor 212 completing a circuit from battery through resistor 2–GA, winding of relay 2–TC, back contact of relay 2–TC to ground on conductor 212, operating relay 2–TC. Relay 2–TC locks over its own front contact and a front contact of relay 2–D to ground.

After the initial entry has been made by the billing equipment, the special sender controls the completion of the connection, using another marker. For a local termination relays 2–LF and 2–TF are again operated when the marker seizes the trunk link connector. With relay 2–LF operated, battery through resistor 1–D is connected over a front contact of relay 2–LF to conductor 104 to operate a relay individual to the trunk on the trunk link frame. The marker controls the ringing selection switch, first grounding conductor 105 to complete a circuit over a front contact of relay 2–LF to battery through the winding of relay 1–RC. Relay 1–RC operates and closes a locking circuit for itself over a back contact of the charging relay 1–CH, front contact of relay 1–RC, back contact of the ringing trip relay 1–RT, conductor 106, and through the ringing selection switch to ground supplied over a front contact of relay 2–D and conductor 107. With relay 1–RC operated, the marker completes a circuit over conductor 108, front contact of relay 1–RC, front contact of relay 2–LF, front contact of relay 2–D to conductor 110 to operate the hold magnet of the ringing selection switch.

When relay 1–RC operates at this time, the circuit of relay 1–RV is opened and the connection of battery and ground to conductors 100 and 101 is restored to normal. Relay 1–CH, in operating as later described, holds the circuit of relay 1–RV open.

When the ringing selection switch has been operated, the marker releases, in turn releasing relays 2–TF and 2–LF leaving the hold magnet of the ringing selection switch held over conductor 110, front contact of relay 2–D, back contact of relay 2–LF, conductors 106 and 107 to ground over a front contact of relay 2–D. The ringing selection switch at the beginning of the ringing cycle connects ground to conductor 111 completing a circuit over a front contact of relay 1–RC, back contact of relay 1–CH, front contact of relay 2–D to battery through the winding of relay 1–PU. Relay 1–PU operates and locks over one of its front contacts and front contact of relay 2–D to ground. With relay 1–PU operated, ringing current, which is connected through the winding of relay 1–RT to conductors 112 and 113 by the ringing selection switch is extended over front contacts of relays 1–PU and 1–RC to conductors 114 and 115 leading toward the called line. When the called subscriber answers, relay 1–RT operates, releasing relay 1–RC. With relay 1–RC released, conductors 114 and 115 are extended to the windings of relay 1–S causing that relay to operate.

When relay 2–D operated, circuits were prepared for the timing tube 1–CHT. Positive battery is normally connected to the main anode of the tube 1–CHT and is connected through resistors 1–D and 1–E to condenser 1–B and ground. With relay 2–D operated, condenser 1–B is connected to the control anode of tube 1–CHT and the upper winding of relay 1–CH is included in a circuit extending from the cathode of tube 1–CHT, front contact of relay 2–D, upper winding of relay 1–CH, back contact of relay 1–CH, front contact of relay 2–B, back contact of relay 2–TF, front contact of relay 2–D to ground. Until relay 1–S operates, ground is connected over a back contact of relay 1–S, back contact of relay 2–T, and a back contact of relay 1–CH to resistor 1–E in shunt of the positive battery through resistor 1–D. When relay 1–S operates, this shunt is opened and condenser 1–B charges. When this charge reaches the breakdown potential of tube 1–CHT, the tube breaks down and relay 1–CH operates. Relay 1–CH locks in a circuit from battery through its lower winding over its own front contact, a front contact of relay 2–B, back contact of relay 2–TF, front contact of relay 2–D, and ground, opening at its back contact the circuit through its upper winding to quench the tube 1–CHT.

With relay 1–CH operated, ground supplied to conductor 109 from the ringing selection switch completes a circuit over a front contact of relay 1–CH, front contact of relay 2–TC, winding of relay 2–MA to battery through resistor 2–GB. Relay 2–MA operates and locks to ground over its own front contact. With relay 2–MA operated, conductor 215 is connected over a front contact of relay 2–MA and a front contact of relay 2–TC to conductor 211 to initiate the operation of the accounting equipment to make the answer entry. When the answer entry has been completed, the accounting equipment connects ground to conductor 216 which extends over a back contact of relay 1–RC, front contact of relay 2–D, front contact of relay 2–MA, front contact of relay 2–TC to battery through resistor 2–GA in shunt of the winding of relay 2–TC causing relay 2–TC to release to indicate that the answer entry has been completed.

When the calling subscriber releases, relay 1–AE releases, in turn releasing relays 2–B, 2–R and 2–D. With relay 2–D released, conductors 211 and 215 are connected together over a front contact of relay 2–MA and a back contact of relay 2–D to initiate the disconnect entry. At the end of the disconnect entry, ground is connected to conductor 216 which is extended at this time over a back contact of relay 1–RC, back contact of relay 2–D and a front contact of relay 2–MA to battery through resistor 2–GB in shunt of the winding of relay 2–MA causing relay 2–MA to release.

If the called substation disconnects first, the disconnect entry is delayed. The release of relay 1–S closes a circuit from ground over a back contact of relay 1–S, back contact of relay 2–T, front contact of relay 2–D, front contact of relay 1–CH through the heater winding of thermostatic relay 1–RL. After an interval, relay 1–RL closes its contact completing a circuit from ground over the contact of relay 1–RL, front contact of relay 2–MA to battery through the winding of relay 1–RC. Relay 1–RC operates and locks to ground over its own front contact in parallel with the contact of relay 1–RL and, with relay 1–RC operated, conductors 211 and 215 are connected together to initiate a disconnect entry as previously described. With relay 1–RC operated, ground is connected to conductor 222 leading to the accounting equipment to indicate that the disconnect entry has been delayed. When the disconnect entry is completed, relay 2–MA is shunted and released, opening the locking circuit for relay 1–RC, permitting that relay to release. Relay 1–RC, in operating, disconnects conductors 114 and 115 from the windings of relay 1–S causing that relay to release, and in turn, release relay 1–CH. With relays 1–S and 1–CH released, the circuit for relay 1–RL is opened and that relay opens its contacts. However the switches are not released until both subscribers have disconnected or until a time interval elapses following disconnect by the calling subscriber, since ground is connected to conductors 117 and 217 over a front contact of relay 2–D which is held operated under the control of the calling line and over a back contact of relay 1–RC and a front contact of relay 1–CH. Relay 1–CH is normally held operated under the control of the calling line, but is also held operated in a circuit from battery through its lower winding and over its own front contact, back contact of relay 2–B and front contact of relay 1–S if the called line holds after the calling line disconnects. Under this condition ground is also connected over a front contact of relay 1–S, back contact of relay 2–D, front contact of relay 1–CH to the heater winding of thermostatic relay 1–RL. Relay 1–RL operates relay 1–RC as above described, releasing relays 1–S and 1–CH and disconnecting ground from conductors 117 and 217.

If the call is to be extended through the main office to another office, the marker obtains access to the trunk over the line link termination shown in Fig. 2, connecting ground to conductor 217 during the time that relay 2–TF is operated to operate relay 1–TS. After relay 2–TF is released, relay 1–TS remains operated in a circuit from battery through its winding, back contact of relay 2–TF, front contact of relay 1–TS, front contact of relay 2–D to ground. In addition, relay 2–TF, while operated, closes a circuit through the winding of relay 2–TF1 operating the latter relay. Relay 1–TS closes a biasing circuit through the lower winding of supervisory relay 2–SV. Relay 1–TS also disconnects the incoming talking circuit from conductors 114 and 115 leading to the trunk link frame and connects them over conductors 118 and 119 and back contacts of relays 2–TB and 2–T to the left windings of repeating coil 2–A. When the marker has completed its operations and releases relay 2–TF, the upper winding of relay 2–SV is connected through the right windings of repeating coil 2–A over conductors 218 and 219 and the link switches to the outgoing trunk. Relay 2–TF, in releasing, opens the circuit of relay 2–TF1 which is slow to release and thereby prevents the operation of relay 2–T in response to the initial off-hook signal provided by the intertoll trunk.

The initial entry is made, as previously described, resulting in the operation of relay 2–TC. When relay 2–SV operates in response to an answer by the called subscriber, a circuit is closed from ground over the front contact of relay 1–TS, front contact of relay 2–SV, back contact of relay 2–TF1 to battery through the winding of relay 2–T. Relay 2–T operates and closes a circuit from ground over a back contact of relay 1–CH, front contact of relay 1–TS, front contact of relay 2–T to battery through the winding of relay 2–TA. Relay 2–TA operates in this circuit and locks over a front contact of relay 2–TA, front contact of relay 1–TS, back contact of relay 1–CH to ground. With relay 2–T operated, the talking circuit remains dependent upon back contacts of relay 2–TB. With relay 2–T operated, the shunt around condenser 1–B is opened and tube 1–CHT functions to operate relay 1–CH as above described. Relay 1–CH operates relay 2–MA, as before, to initiate the answer entry which is followed by the release of relay 2–TC.

When the called subscriber disconnects, relay 2–SV releases, in turn releasing relay 2–T. Release by the calling subscriber releases relays 1–AE and 2–B to initiate the disconnect entry as above described. The release of relay 2–T closes a circuit from ground over a back contact of relay 1–CH, front contact of relay 1–TS, back contact of relay 2–T, front contact of relay 2–TA to battery through the winding of relay 2–TB. Relay 2–TB operates in this circuit and disconnects the repeating coil 2–A from the incoming end of the trunk. If the calling subscriber delays disconnection, the release of relay 2–T closes the previously traced circuit for operating thermostatic relay 1–RL which functions as above to cause the disconnect entry to be made. When both subscribers have disconnected relay 1–TS releases and restores the trunk to its normal condition.

When the marker first operates the relay 2–TF, ground is connected to conductor 220 leading to the service-observing connector of Figs. 8 to 13 to initiate connection of the trunk with the service-observing equipment. When the connector selects this trunk for observation and connects it through to the equipment, branches of conductors 213 and 214 as well as the conductors 224 and 221 are connected to the service observing circuit.

It may be noted that the special outgoing sender and the CAMA operator are used for local subscribers on party lines having more than two parties. For such calls, a junctor circuit is used which connects an outgoing appearance on the trunk link frame with an incoming appearance on the line link frame of the same office unit or on the line link frame of a second office unit, the call being completed over a simple outgoing trunk. These junctors are also observed, but for simplicity have not been illustrated in detail.

*AMA trunk*

Figure 7:
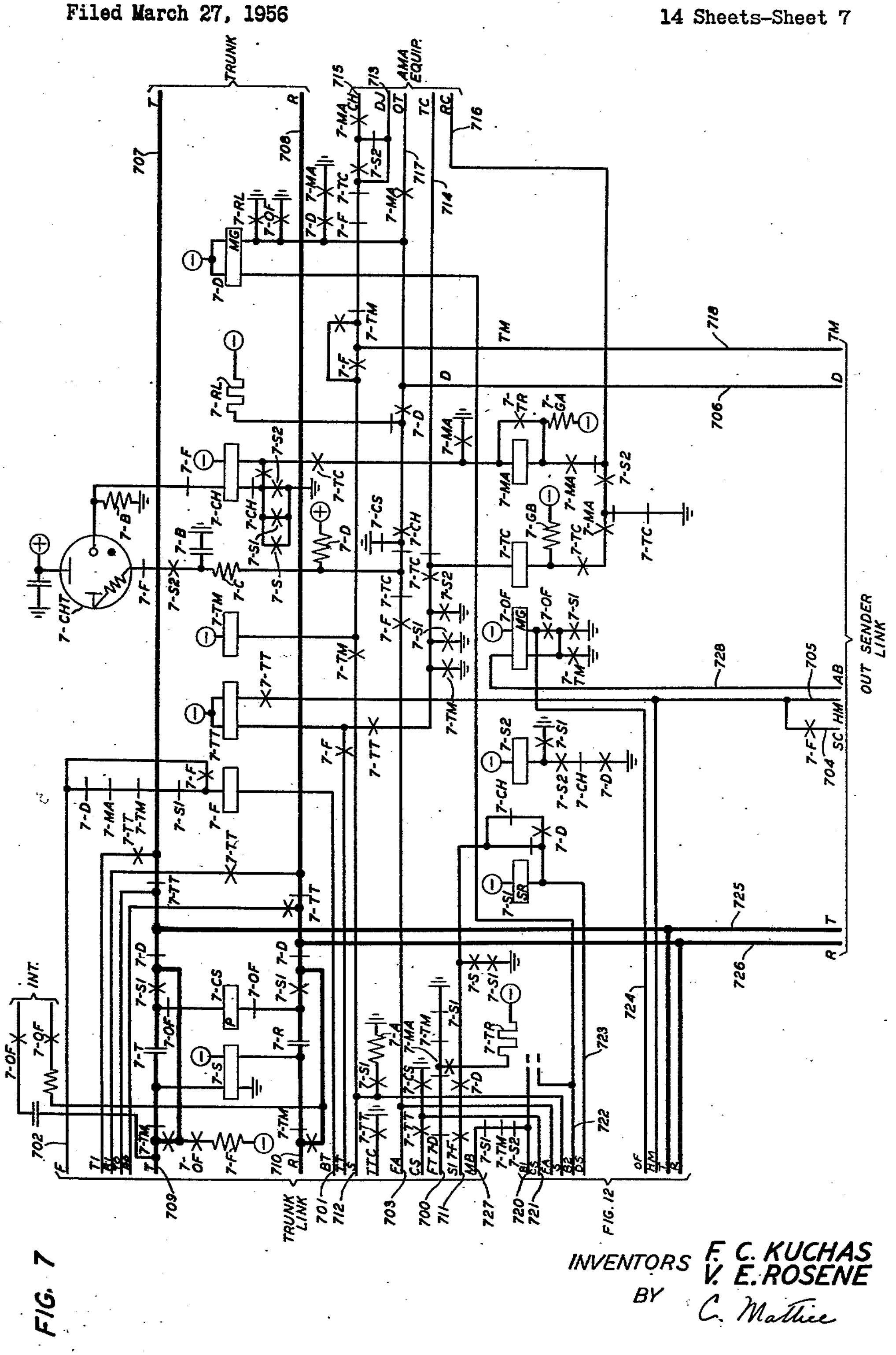
Fig. 7 shows an outgoing AMA trunk.

The outgoing trunk of Fig. 7 appears on the trunk link frame. When the trunk is idle, it connects ground to conductor 700 over back contacts of relays 7–D, 7–MA, 7–TM and 7–S1. The marker uses this conductor to select an idle trunk link frame having an idle trunk of the desired route. Conductors 701 and 702 are also connected together when the trunk is idle over back contacts of relays 7–D, 7–MA, 7–TM, 7–S1 and the winding of relay 7–F. The marker uses these conductors to test for an idle trunk after having selected the trunk frame, connecting ground to conductor 702 and a test relay to conductor 701. When this trunk is selected to be used, low resistance battery is connected to conductor 701 operating relay 7–F. Relay 7–F, in operating, locks to conductor 702 independent of relays 7–S1, etc. Relay 7–F also connects ground over back contacts of relays 7–CS, 7–CH, 7–TC and the front contact of relay 7–F to conductor 703 to operate a relay individual to the trunk on the trunk link frame to give the marker access to the trunk and to the outgoing connection. With relay 7–F operated, the control circuits for the timing tube 7–CHT are opened to prevent false charge. At the same time that the above operations are taking place, the marker selects an idle outgoing sender and prepares a circuit for operating the sender link. With relay 7–F operated, conductors 704 and 705 are connected together to operate the hold magnet of the sender link, the hold magnet remaining operated under the control of the outgoing sender. When the trunk has been connected with the sender, the sender connects ground to conductor 706 completing a circuit through the right winding of relay 7–D, operating that relay. Relay 7–D disconnects the outgoing tip and ring conductors 707 and 708 from the trunk circuit. Branches of conductors 707 and 708 extend over conductors 725 and 726 through the sender link to the sender so that the sender can signal the distant office as required to set up the connection in that office.

With relay 7–D operated, ground connected to conductor 711 by the marker is extended over a front contact of relay 7–F, front contact of relay 7–D, back contact of relay 7–CH, front contact of relay 7–D to battery through the winding of relay 7–S1. Relay 7–S1 operates and connects ground through resistor 7–A to conductor 712 to hold the line link and trunk link frames after the trunk link connector circuit has been released.

Relay 7–S1, in operating, closes an operating circuit for relay 7–S2, and that relay operates, locking over its own front contact, back contact of relay 7–CH, front contact of relay 7–D to ground.

When the marker has completed its functions, it releases relay 7–F, in turn releasing the trunk link relay, causing the subscriber's line to be connected to conductors 709 and 710 and completing a circuit over back contacts of relay 7–TM through the windings of relay 7–S, to ground and battery. Conductor 712 is extended to the hold magnets of the established connection. Relay 7–S operates in series with the calling line, completing a holding circuit for relay 7–S1 which may be traced from battery through the winding of relay 7–S1, front contact of relay 7–D, back contact of relay 7–CH, front contact of relay 7–S, front contact of relay 7–S1 to ground. Relay 7–S1 is slow to release to hold over the time between the removal of ground from conductor 711 by the marker and the operation of relay 7–S over the subscriber's line.

When the marker has disconnected, the sender causes the initial entry to be made, connecting ground to conductor 718 which extends over a back contact of relay 7–TM, back contact of relay 7–F, back contact of relay 7–TC to conductor 713 leading to the AMA equipment. When the initial entry has been made, the AMA equipment connects ground to conductor 714, completing a circuit over a back contact of relay 7–TC through the winding of relay 7–TC to battery through resistor 7–GB. Relay 7–TC operates and locks over one of its front contacts and the front contacts of relays 7–S1 and 7–S2 to ground. When the initial entry has been completed, the outgoing sender is released. The sender, in releasing, releases relay 7–D extending the trunk conductors 707 and 708 over back contacts of relay 7–TT, back contacts of relay 7–D, front contacts of relay 7–S1, and back contacts of relay 7–OF to the winding of polarized relay 7–CS. When the called subscriber answers in response to ringing current supplied at the distant office, a reverse battery signal is received over conductors 707 and 708 causing relay 7–CS to operate.

Following the release of relay 7–D, relay 7–S1 holds operated over the back contact of relay 7–D to ground over the front contacts of relays 7–S and 7–S1.

When relay 7–F released and relay 7–S2 operated, the circuit for relay 7–CH was prepared. High voltage positive battery is normally connected to the main anode of tube 7–CHT. The control cathode is connected over a back contact of relay 7–F, front contact of relay 7–S2, condenser 7–B and through resistors 7–C and 7–D to high voltage positive battery. Until relay 7–CS operates, ground is connected over a back contact of relay 7–CS and the back contact of relay 7–CH to resistor 7–D in shunt of the positive battery, holding condenser 7–B discharged. The cathode of tube 7–CHT is connected over a back contact of relay 7–F through the left winding and back contact of relay 7–CH to ground over front contacts of relays 7–S, 7–S1 and 7–S2 in parallel. When relay 7–CS operates, removing the shunt from resistor 7–D, condenser 7–B starts to charge, and when the charge reaches the breakdown potential of tube 7–CHT, that tube breaks down, operating relay 7–CH. Relay 7–CH closes a locking circuit for itself from battery through its right winding over its own front contact to ground over front contacts of relays 7–S, 7–S1 and 7–S2 in parallel. Relay 7–CH, in operating, opens its operating circuit to quench tube 7–CHT. Relay 7–CH closes a circuit from ground over the front contacts of relays 7–S, 7–S1 and 7–S2 in parallel, front contact of relay 7–CH, front contact of relay 7–TC, winding of relay 7–MA to battery through resistor 7–GA. Relay 7–MA operates and locks over its own front contact to ground.

With relay 7–MA operated, ground supplied to conductor 713 from the AMA equipment is connected over a front contact of relay 7–TC and the front contact of relay 7–MA to conductor 715 causing the answer entry to be made. When the answer entry has been completed, ground is connected to conductor 716, completing a circuit over front contacts of relays 7–S2, 7–MA and 7–TC to resistor 7–GB in shunt of the winding of relay 7–TC, causing relay 7–TC to release, in turn dismissing the charging equipment.

The release of the connection is normally under the control of the calling subscriber. When the calling subscriber disconnects, relay 7–S releases, in turn releasing relays 7–S1 and 7–S2. With relay 7–S2 released, conductors 713 and 715 are again connected together to initiate the disconnect entry. When the disconnect entry has been completed, ground is again connected to conductor 716 and, with relay 7–S2 released, this ground is extended over a back contact of relay 7–S2, front contact of relay 7–MA to battery through resistor 7–GA in shunt of the winding of relay 7–MA causing the latter relay to release. The release of relays 7–S, 7–S1, and 7–S2 releases relay 7–CH. The release of relay 7–MA following the disconnect entry again connects ground to conductor 700 and prepares the circuit for relay 7–F thereby marking the trunk available to the marker. The release of relay 7–S1 also disconnects the winding of relay 7–CS from conductors 707 and 708 to pass a disconnect signal to the distant office.

If the called subscriber disconnects first, the release of relay 7–CS closes a circuit from ground over the back contact of relay 7–CS, front contact of relay 7–CH, back contact of relay 7–D through the heater winding of thermostatic relay 7–RL. If the calling subscriber disconnects promptly thereafter, the release of relay 7–CH opens the circuit of relay 7–RL and disconnection takes place as above described. If the calling subscriber continues to hold until relay 7–RL closes its contact, a circuit is closed from ground over the contact of relay 7–RL through the right winding of relay 7–D to battery. Relay 7–D, in operating at this time, locks in a circuit from battery through its right winding over its own front contact and the front contact of relay 7–MA to ground. Relay 7–D also opens the circuit of relay 7–RL to permit the heater to start cooling. Relay 7–D opens the circuit of relay 7–S1 which releases, in turn releasing relay 7–S2. With relay 7–S2 released, the disconnect entry is made as above described except that with relay 7–D operated, ground is connected over the back contact of relay 7–CS, front contact of relay 7–CH, which is held operated under the control of relay 7–S, front contact of relay 7–D, front contact of relay 7–MA to conductor 717 to cause a time-out indication to be given to the accounting equipment so that the accounting center may adjust the time of the call for the time-out period.

In order to prevent overtime charges due to delay in obtaining access to the charging equipment, the release of relay 7–S1 closes a circuit from ground over back contacts of relays 7–S1 and 7–TM and the front contact of relay 7–MA to the heater winding of the timed release relay 7–TR. The normal release of relay 7–MA opens the heater circuit for relay 7–TR; but, if due to delay, relay 7–TR closes its contact, it shunts relay 7–MA restoring the trunk to normal without making a disconnect entry.

Relay 7–TM is operated if the trunk is used to set up a tandem call in which case the supervisory relays 7–S and 7–CS do not function and charging is performed elsewhere in the connection. Relay 7–TT is used when the trunk is seized on a test call. If the sender cannot complete the connection, it operates relay 7–OF over conductor 728 to provide interrupted tone on a subscriber call and interrupted ground on a tandem call.

This type of trunk is connected with the service observing circuit by a number of conductors, including branches of conductors 712, 703, 705, 725 and 726. Conductor 720 is connected to the make-busy conductor 727 when the trunk is normal, and conductor 722 is connected to conductor 720 when a plug is inserted in a make-busy jack individual to the trunk. Conductor 721 is connected to ground when relay 7–CS operates. Conductor 723 extends to the winding of relay 7–S1 and, therefore, to the operating and locking circuits for this relay. Conductors 725 and 726 are the conductors by which the sender is connected to the outgoing conductors 707 and 708. The function of these connections between the trunk and the service observing circuit will appear hereinafter.

SERVICE OBSERVING EQUIPMENT

*Service observing trunk circuit*

The operation of the service observing connector circuit, shown in Figs. 8 to 13, in interconnecting a trunk with the individual service observing circuit will be described first. The service observing desk is connected with the observing equipment at the office to be observed by means of a six-conductor trunk which terminates in the service observing trunk circuit of Fig. 13, is connected with the service observing connector circuit and is extended to one or the other service observing circuit in accordance with the type of call to be observed. Of these conductors, conductors 1300 and 1301 are used initially for carrying signals from the desk to the service observing equipment. Conductors 1302 and 1303 are used chiefly for transmitting designations to the desk while conductors 1304 and 1305 are used chiefly for monitoring. All of these pairs have other functions which will appear hereinafter.

When the service observing equipment is idle, conductor 1300 is connected over a back contact of relay 13–DC, right winding of polarized relay 13–PB, resistors 13–Y1, and 13–Y, right and left windings of marginal relay 13–ST, left winding of relay 13–PB, back contact of relay 13–DC to conductor 1301.

Conductor 1302 is connected through the right upper winding of repeating coil 13–T1, back contact of relay 12–ST1, right winding of marginal relay 13–CAM, winding of relay 13–MA to ground, while conductor 1303 is connected through the lower right winding of repeating coil 13–T1, back contact of relay 12–ST1, left winding of relay 13–CAM, resistor 13–TB to battery.

Conductor 1304 extends through the upper right winding of repeating coil 13–T, resistor 13–AD, left winding of polarized relay 13–D, back contact of relay 12–ST2, left winding of marginal relay 13–FCA, back contact of relay 12–ST2 to ground. Conductor 1305 extends through the lower right winding of repeating coil 13–T, resistor 13–AD1, back contact of relay 12–ST1 to battery through resistor 13–TB1 and in parallel therewith through the right winding of relay 13–D, back contact of relay 12–ST2, resistor 13–TG to ground.

With the observing circuits in this condition the operator at the observing desk may set the class of observation and, if desired, may set the trunk reduction circuit. To set the class of observation, a key is provided at the service observing desk associated with conductors 1302 and 1303. If AMA calls to foreign areas only are to be observed, this key is left in its normal position and neither relay 13–CAM nor relay 13–MA is operated. When AMA calls within the home area as well as calls to foreign areas are to be observed, the key at the service observing desk is thrown to a position in which a high resistance bridge is connected across conductors 1302 and 1303, operating relay 13–MA. With relay 13–MA operated, a circuit is closed from ground over a front contact of relay 13–MA, back contact of relay 13–CA1, winding of relay 13–MA1 to battery. Relay 13–MA1 operates in this circuit and prepares a locking circuit for itself over the front contact of relay 12–ST1 which becomes effective when the circuit is put into service. Relay 13–MA1 is slow to release so that it remains operated after relays 13–CAM and 13–MA are disconnected from trunk conductors 1302 and 1303 until relay 12–ST1 closes its front contact. Relay 13–MA1 in operating closes an obvious circuit for relay 13–HFA. If only CAMA calls are to be observed, the class key at the service observing desk is operated to a position to place a low resistance bridge across conductors 1302 and 1303, operating both relay 13–MA and relay 13–CAM. Relay 13–CAM closes an obvious circuit for relay 13–CA1 which prepares a locking circuit for itself under the control of relay 12–ST1 and is also slow to release to cover the operate time of relay 12–ST1. Relay 13–CA1, in turn operates relay 13–CA2 and relay 13–CA2 closes an obvious circuit for operating relay 13–CMA. Relay 13–CA1, when operated, opens the operating circuit for relay 13–MA1 so that the operation of relay 13–MA is ineffective under this condition. Referring to Fig. 12, it will be seen that with relays 13–CMA and 13–HFA both deenergized, ground is connected to conductor 1201 to cause the marker to mark AMA trunks used in connection with foreign area calls for observation. With relay 13–HFA operated, ground is connected to conductor 1200 to cause the marker to mark AMA trunks used for both home and foreign area calls. With relay 13–CMA operated, ground is connected to conductor 1202 to cause the marker to mark CAMA trunks for observation.

The trunk reduction circuit 1206 is similar to the circuit included in the above-identified Rosene patent and is operated under the control of a key associated with conductors 1304 and 1305. With this key in its normal position, neither relay 13–D nor 13–FCA is operated and the whole group of trunks is subject to observation. With this key in one off-normal position, conductors 1304 and 1305 are connected together directly and relays 13–D and 13–FCA are both operated. With this key in its other off–normal position, conductors 1304 and 1305 are connected together over a high resistance bridge, causing relay 13–D to operate alone. Relay 13–D, when operated, with relay 13–ST2 normal, connects ground to conductor 1203 to cause trunk reduction circuit 1206 to select one subgroup of trunks for observation. On the other hand, relay 13–FCA operated with relay 12–ST2 normal connects ground to conductor 1204 to select a different subgroup of trunks for observation. Trunk reduction circuit 1206 is held in its set condition under the control of relay 12–ST1.

When the service observing desk is placed in service, a key is operated at the desk which connects battery to conductor 1300 and ground to conductor 1301. Relays 13–ST and 13–PB operate in response to this signal. Relay 13–ST closes a circuit from ground over its front contact, back contacts of relays 12–AL and 12–AR to battery through the winding of relay 12–ST1. Relay 12–ST1 operates and closes an obvious circuit for operating relay 12–ST2.

Relay 12–ST1 disconnects conductors 1302 and 1303 from the class selection relays 13–CAM and 13–MA, and extends them through resistors 13–AA and 13–AB toward the service observing circuits. Assuming that the class selected is AMA, the observing circuit of Figs. 5 and 6 will be used and conductors 1302 and 1303 will be extended through the right windings of repeating coil 13–T1 over front contacts of relay 12–ST1 through resistors 13–AA and 13–AB and conductors 1306 and 1307 to the observing circuit of Figs. 5 and 6. A branch of conductor 1306 extends through resistor 13–X and over conductor 1308 to Fig. 5.

Figure 6:
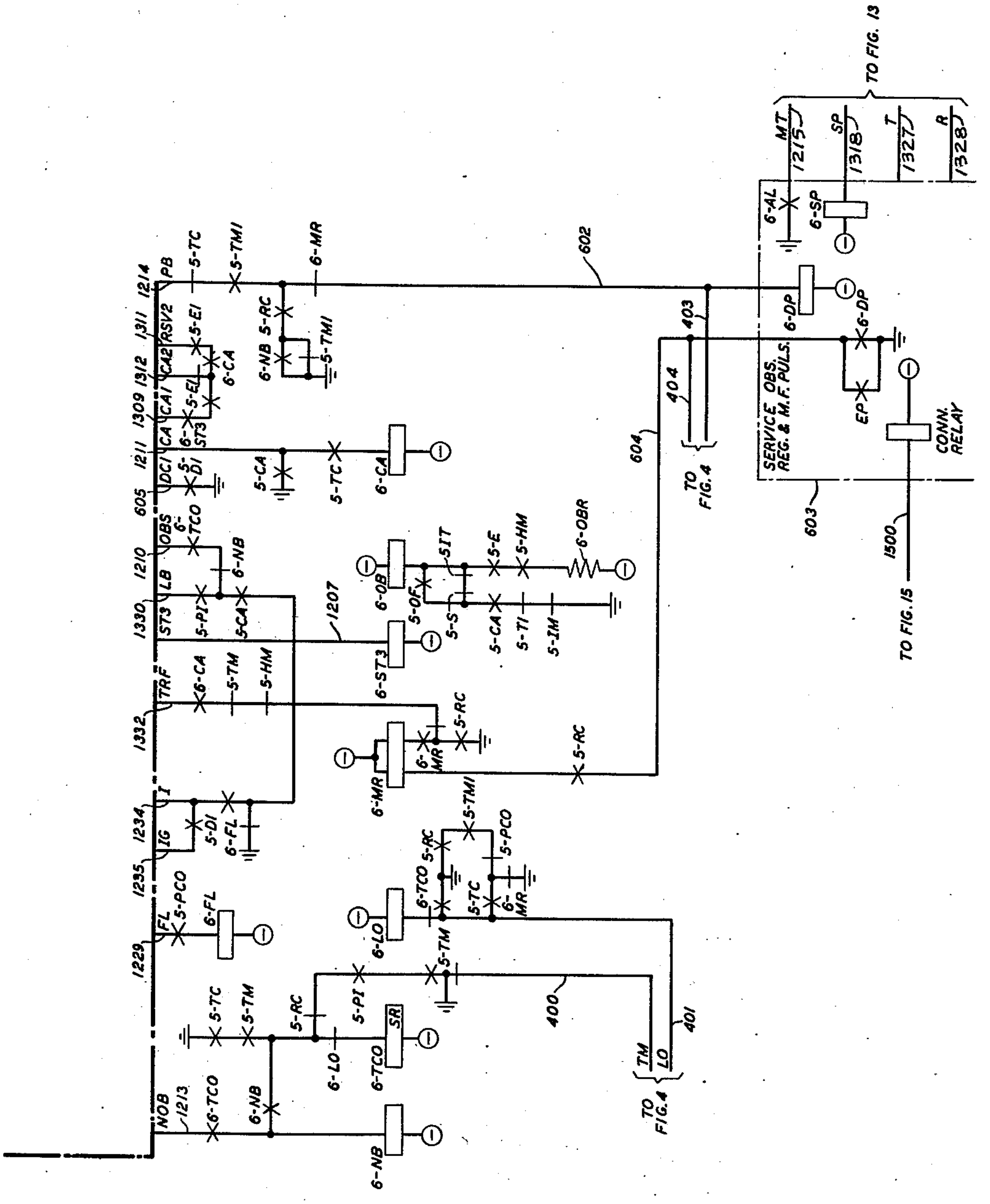

Relay 12–ST1 also disconnects conductor 1305 from battery through resistor 13–TB1, and with relay 12–ST2 operated, conductor 1305 extends through the lower right winding of repeating coil 13–T, resistor 13–AD1, right winding of relay 13–D, front contact of relay 12–ST2 to conductor 1309 leading to Fig. 6. Conductor 1304 extends through the upper right winding of repeating coil 13–T, resistor 13–AD, left winding of relay 13–D, front contact of relay 12–ST1, left and right windings of relay 13–FCA, to conductor 1312. A branch of this circuit extends in parallel with the windings of relay 13–FCA over a front contact of relay 12–ST2, resistor 13–U to conductor 1310 leading to Fig. 5. A branch of conductor 1310 extends through resistor 13–U1 to conductor 1311 leading to Fig. 6.

Relay 12–ST1 completes the holding circuits for the class selection relays and the trunk reduction circuit. Since AMA trunks are to be observed, relay 12–ST2 closes a circuit over the back contact of relay 13–CA2, conductor 1207 to battery through the start relay 6–ST3 of the AMA service observing circuit. Relay 6–ST3 closes the heater circuits for tubes 5–ET, 5–MT, 5–OFT and 5–HMT in the service observing circuit. Relay 6–ST3 also connects ground to resistors 5–E7, 5–E6, 5–M5 and 5–M7 to complete voltage dividers which provide a proper potential on the cathodes of tubes 5–ET and 5–MT. Relay 6–ST3, in addition, closes a circuit from ground over the back contact of relay 5–TC and the front contact of relay 6–ST3 to battery through the winding of relay 5–CH causing relay 5–CH to operate. The operation of relay 5–CH connects conductors 1205, 1212, and 1220 to 1226 to positive battery through the winding of relay 5–MT to check these conductors for false ground or false negative battery. If either condition is present on any of these conductors, relay 5–MT operates and causes an alarm to be sounded as will appear hereinafter.

Relay 12–ST2 completes the heater circuit for tube 10–FRTO and tube 10–TKTO as well as for the other similar tubes associated with other frames and trunks in the connector. Relays 12–ST1 and 12–ST2 prepare other circuits which will be traced later. The control circuit and the AMA observing circuit are now ready to receive a "position idle" signal from the service observing desk.

When a position is idle, the connection of ground and battery to conductors 1300 and 1301 is reversed so that relay 13–PB releases. With relay 13–PB unoperated and relay 12–ST2 operated, ground is connected to conductor 1208 leading to the observing circuit where it extends over a front contact of relay 6–ST3, back contacts of relays 5–RC and 5–TM to the junction between resistors 5–M2 and 5–M1 which are connected between battery and the left grid of tube 5–MT. The connection of ground to conductor 1208 makes the left side of tube 5–MT conducting and operates relay 5–PI. Relay 5–PI closes a shunt around the back contacts of relays 5–RC and 5–TM to hold relay 5–PI independent of relays 5–RC and 5–TM. Relay 5–PI operated, completes a circuit from ground over a back contact of relay 5–TC, front contact of relay 5–PI, back contact of relay 6–LO to battery through the winding of relay 5–TM which operates. Relay 5–TM closes an obvious circuit for operating relay 5–TM1. Relay 5–TM also connects ground over a front contact of relay 5–PI to conductor 1331. This circuit later serves to hold relay 13–LB operated through front contact 13–LB and maintain the seizure signal to the desk. In addition, it closes a circuit from ground over the front contact of relay 5–TM, front contact of relay 5–PI, back contacts of relays 5–RC and 6–LO to battery through the winding of relay 6–TCO operating the latter relay. With relay 6–TCO operated, ground is connected over conductor 1319 and the back contact of relay 13–CA2 to battery through the winding of relay 13–MKA which operates. In addition, ground is connected over back contacts of relays 5–TC and 5–RC, front contact of relay 6–TCO and conductor 1333 to battery through the winding of relay 13–CO. Relay 13–CO operates in this circuit and in turn operates relay 13–CO1. The service observing equipment is now ready to observe on a call.

*Service observing connector*

With relay 13–MKA operated, the grid circuits of all tubes such as tube 10–FRTO are connected to the FA leads from AMA trunks. There is a tube, like tube 10–FRTO, for each frame and the FA leads of all the AMA trunks on a frame, which are arranged for service observing, are connected in multiple to the frame tube.

Whenever the marker seizes a trunk circuit, for example the trunk circuit of Fig. 7, for use in a connection, the operation of relay 7–F connects ground to conductor 703 to operate a trunk relay in the trunk link connector as above described. If that circuit is wired for service observing, ground on conductor 703 is extended to the service observing connector where it is connected to the midpoint of a voltage divider comprising resistors 10–BAO and 10–FAO through resistor 10–FAO and resistor 10–E1O, varistor 10–T1O, front contact of relay 13–MKA to the midpoint of a voltage divider comprising resistors 10–A and 10–B which are connected in turn to the grid of tube 10–FRTO.

The FA leads of all AMA trunks on frame O are similarly connected to the grid of tube 10–FRTO. A maximum of three FA leads are connected to one varistor, a maximum of two varistors being used for the same class and frame. If CAMA trunks appear on the same frame they are connected to the frame tube through separate varistors. The arrangement of the resistors and varistors is such that ground on one FA lead is not fed back to other trunk circuits.

When conductor 703 which is connected, as above described to the grid of tube 10–FRTO, is grounded by seizure of the associated trunk circuit, the tube breaks down and relay 10–FR00 operates. The frame relays, including 10–FR00, frame auxiliary relays such as relay 8–FA00, cut-through relays such as relay 9–CTA00 and individual trunk connecting relays such as relay 11–AA00 are arranged in even and odd groups, so that observation may continue on some trunks in spite of troubles which may occur on one or the other group circuit. The connector cannot be prepared to select a call for observation except at a time when no FA lead is grounded in one group. If none of the FR relays, such as relay 10–FR00, of the odd group is operated, a circuit is closed from battery through the winding of relay 10–FC1, conductor 1000, back contacts of all odd group FR relays, including relays 10–FR19 and 10–FR01, back contacts of all odd FA relays including relays 8–FA19 and 8–FA01, conductor 800 to ground over front contacts of relays 13–CO or 13–CO1 and relay 12–ST2, operating relay 10–FC1. If no even group FR relay is operated, a similar circuit is closed from battery through the winding of relay 10–FC, conductor 1001, back contacts of the even relays 10–FR18 to 10–FR00, back contacts of even relays 8–FA18 to 8–FA00, conductor 801 to ground over contacts of relays 13–CO or 13–CO1 and 12–ST2, operating relay 10–FC. With relay 10–FC1 operated, a circuit is closed from battery through the winding of relay 10–FB1, front contact of relay 10–FC1, front contact of relay 13–CO or relay 13–CO1 to ground, operating relay 10–FB1 which locks over its own front contact independent of relay 10–FC1. Similarly relay 10–FC operates relay 10–FB which locks independent of relay 10–FC.

Since the marker only works with one trunk on a frame, only one FA lead can be grounded on that frame at a time but several markers may seize trunks arranged for service observing, each one on a separate trunk frame so that ground can appear on several frames operating the corresponding FR relays. With a call on the trunk of Fig. 7 operating relay 10–FR00, as above described, the circuit of relay 10–FC is opened and that relay releases. With relay 10–FC released, a circuit is closed from battery over the back contact of relay 10–FC, front contact of relay 10–FB, conductor 1002, winding of relay 8–FA00, back contact of relay 8–FA00, front contact of relay 10–FR00 and over the back contacts of all of the even FA relays including relays 8–FA18 and 8–FA00 to ground over conductor 801. Relay 8–FA00 operates in this circuit and locks over its front contact to ground on conductor 801.

If calls come in on two even frames, the FR relay associated with the lower numbered frame opens the circuit for operating the auxiliary relay for the higher numbered frame and therefore the lower numbered frame will be preferred. For calls on odd numbered frames, relay 10–FC1 is released and one of the auxiliary relays 8–FA19 to 8–FA01 is operated. If calls come in on both even and odd frames the choice depends upon whether relay 10–FC or relay 10–FC1 releases first. Relay 10–FC has the preference, but if relay 10–FC1 releases slightly ahead of relay 10–FC, relay 10–FC is held operated over its own front contact, back contact of relay 10–FC1, front contact of relay 10–FB1 to ground over the front contact of either relay 13–CO or relay 13–CO1.

Assuming that relay 8–FA00 is operated, as above described, a circuit is now closed for informing the marker that there is an idle position at the service observing desk. This circuit extends from ground, front contacts of relays 13–CO or 13–CO1, windings of relays 10–OBS and 10–NOB, conductor 1003, front contact of relay 8–FA00, conductor 802, through the trunk line connector to the marker. While the trunk which has started the operation of the service observing connector is arranged for service observing, the marker may have information indicating that the particular call involved should not be observed. It may be a test call, it may be a call of a type on which the service observing equipment is not prepared to observe, or the trunk may be one used for a class having different charge rates and the charge rate of the particular call being set up may not require observation.

As shown in Fig. 15, with conductor 1201 grounded to indicate that the service observing circuit wishes to observe on foreign area AMA calls, if the call being observed is of the foreign class, relay 15–TOBS operates and locks. Similarly, if conductor 1202 is grounded to indicate that CAMA calls are to be observed, relay 15–TOBS is operated only if the marker operates a CAMA class relay. If both local and foreign area AMA calls are to be observed, conductor 1200 is grounded and the local observe class relay of the marker is operated only for particular charging rates to operate relay 15–TOBS. For test calls and for routes on which no observing is to be done, a relay NOB is operated. The class relays and relay NOB are not shown but are indicative of relays which may be found in the above-identified Busch patent. With relay 15–TOBS operated and relay NOB non-operated, conductor 802 is extended through the upper winding of relay 15–TOB to negative battery. If relay 15–TOBS is non-operated or with relay 15–TOBS operated and relay NOB also operated, conductor 802 is extended to high potential positive battery.

If conductor 802 is connected to central office negative battery through the winding of relay 15–TOB, relay 10–OBS is operated but if high positive potential is connected to conductor 802, relay 10–NOB operates. It will be assumed that relay 10–OBS is operated at this time. Relay 15–TOB in the marker also operates and operates the service observing register connector relays over conductor 1500 causing the called line designation, as stored in the marker, to be transmitted to the service observing register. The function of the circuit in response to relay 10–NOB will be described hereinafter.

Relay 8–FA00 connects ground to conductor 1209 completing a circuit over the front contact of relay 6–TCO to battery through the winding of relay 5–TC. Relay 5–TC operates in this circuit and locks over its own front contact, back contacts of relays 5–WO, and 6–MR, and front contact of relay 6–ST3, to ground. It also opens the operating circuit for relay 5–CH which releases disconnecting the observing conductors from the test relay 5–MT and connecting them into the service observing circuit. With relay 5–CH released and relay 5–TC operated, a circuit is closed from battery over back contact of relay 5–CH, conductor 500, winding of frame connector relay 9–CTA00, front contact of relay 8–FA00, conductor 900, front contact of relay 13–MKA, back contacts of the individual trunk connector relays 11–AA118 to 11–AA00, conductor 1100, front contact of relay 5–TC, back contact of relay 5–CH to ground. Relay 9–CTA00 operates in this circuit and closes a circuit for selecting and operating the individual trunk relay.

With relay 9–CTA00 operated, the FA leads of a maximum of six trunks selected by that relay are connected over front contacts of relay 9–CTA00 to a set of trunk select tubes such as tube 10–TKT0. Conductor 703, individual to the trunk of Fig. 7, is extended to the grid of tube 10–TKT0, operating relay 10–TKO. With relay 10–TKO operated, ground is connected over a front contact of that relay, conductor 1004, front contact of relay 9–CTA00, conductor 901, winding of relay 11–AA00, conductor 500, back contact of relay 5–CH to battery. Relay 11–AA00 operates in this circuit and locks in the circuit from battery on conductor 500, winding and front contact of relay 11–AA00, conductor 1100, front contact of relay 5–TC, back contact of relay 5–CH to ground. Relay 11–AA00 also connects trunk circuit conductors 705, 712 and 720 to 726 to conductors 1205, 1212 and 1220 to 1226 of the service observing circuit of Figs. 5 and 6. With relay 11–AA00 operated, the operating circuit for relay 9–CTA00 is opened and that relay releases disconnecting the trunk select tubes such as tube 10–TKT0 from the trunk FA conductors.

*Seizure signal*

Relay 10–OBS, when operated as above described, connects ground over its front contact to conductor 1210, leading to the AMA observing circuit where it extends over a front contact of relay 6–TCO, back contact of relay 6–NB, front contact of relay 5–PI, conductor 1330, winding of relay 13–LB to battery. Relay 13–LB operates and transmits a seizure signal to the service observing desk by connecting a shunt around resistors 13–Y and 13–Y1 and the right winding of relay 13–ST. This seizure signal causes a position circuit at the desk to be connected with the service observing trunk and it results in the connection of ground and battery to the conductor pairs 1302–1303 and 1304–1305.

Relay 5–TC, in operating, closes an obvious circuit for operating relay 5–RC.

*Call accepted*

With relay 5–RC operated, a circuit is closed from ground over a front contact of relay 5–RC, front contact of relay 5–TM to battery through the winding of relay 5–E1, operating the latter relay, which locks over its own front contact, front contact of relay 5–TM1, back contact of relay 5–IM, back contact of relay 5–T1, front contact of relay 5–RC to ground. With relay 5–E1 operated, conductors 1309 and 1312 are connected together over front contacts of relays 6–ST3 and 5–E1 and a back contact of relay 6–CA, thereby completing a loop circuit across conductors 1304 and 1305 including both windings of relays 13–D and 13–FCA. With battery and ground connected to conductors 1304 and 1305, as above described, relay 13–FCA operates as a call-accepted signal closing a circuit over the front contact of relay 13–FCA, front contact of relay 12–ST2, conductor 1211, front contact of relay 5–TC to battery through the winding of relay 6–CA. Relay 6–CA operates in this circuit and locks over the front contact of relay 5–TC and its own front contact to ground. With relay 6–CA operated, the loop circuit above traced over conductors 1304 and 1305 opens. The left winding of relay 13–D is connected over front contact of relay 12–ST2 through resistors 13–U and 13–U1 to conductor 1311 while the right winding of relay 13–D is connected over a front contact of relay 12–ST2, conductor 1309, front contact of relay 6–ST3, front contact of relay 5–E1, front contact of relay 6–CA, front contact of relay 5–E1 to conductor 1311, completing a high resistance bridge across conductors 1304 and 1305.

When relay 5–TC operated as above described, it opened the operating circuit for relay 5–TM and relay 5–TM releases slowly. When relay 5–TM releases, the circuit of relay 5–TM1 is opened and that relay starts to release slowly. If relay 5–TM1 releases before relay 6–CA operates, the operation of the connector is recycled to select a different call for observation. However, if the call is accepted and relay 6–CA operates before relay 5–TM1 opens its contact, a locking circuit is closed for relay 5–TM1 over front contacts of relays 5–TM1, 6–CA and 5–PI. Relay 5–TM, in releasing, also opens the holding circuit for relay 6–TCO and that relay also releases slowly.

When relay 6–TCO releases, it opens the circuits extending over conductors 1210, 1213, 1209, 1319 and 1333 to the connector circuit, and releases relay 13–MKA. Relay 13–MKA disconnects the trunk conductor 703 from tube 10–FRTO, also disconnecting the FA leads of other AMA trunks from the corresponding tubes. Opening the circuit over conductor 1333 causes relays 13–CO and 13–CO1 to release slowly in cascade and when relay 13–CO1 is released, the circuits of relays 10–NOB, 10–OBS, 10–FB, 10–FB1, 8–FA00, 10–FC and 10–FC1 are opened so that these relays also release. The trunk selection circuit is now normal with the exception of relay 11–AA00 which is held operated over conductors 1100 and 500 under the control of the AMA service observing circuit.

Relay 11–AA00 in addition to connecting the trunk conductors to the service observing circuit serves to identify the trunk on which the observation is being made. Each trunk connector relay is given a two-digit number from 00 to 99 and the relay, when operated, connects together a tens lead and a units lead corresponding to the digits assigned to the trunk. Therefore, relay 11–AA00 connects together the TO conductor 1240 and the UO conductor 1250. Trunks having numbers over 100 are distinguished from trunks having numbers less than 100 by operating relay 6–FL under the control of the connector relay such as relay 11–AA118. Relay 13–LB is operated, as above described, and is held steadily operated under the control of relay 5–TM for a measured interval. With relay 6–FL operated, following the release of relay 5–TM, the winding of relay 13–LB is connected over conductor 1330, front contacts of relays 5–PI, 6–CA, 6–FL and 5–D1 to conductor 1235 which extends to ground in an interrupter located in the trunk identification circuit 1230. The interrupted operation of relay 13–LB causes the trunk lamp on the service observing desk to flash to indicate that the trunk number is in the second hundred group.

The operation of the service observing connector in connecting with a CAMA trunk is similar to that above described for the AMA trunk except that a separate set of cut-through relays 9–CTC00 to 9–CTC19 are used which are made effective by the connection of battery to conductor 300 and ground to conductor 1150 and the operation of relay 13–MKC by the CAMA service observing circuit. Similarly there is also a separate set of trunk connector relays 11–CA00 to 11–CA99, one of which operates to connect the CAMA service observing circuit to the trunk in a manner similar to the operation of relay 11–AA00.

*Recycle of observing circuit*

As above described, when the frame relay 8–FA00 is operated, it closes a circuit by which the marker operates relay 10–OBS and the latter relay causes the transmission of the seizure signal to the service observing desk. At the same time relay 8–FA00 operates relay 5–TC and the latter relay opens the circuit of relay 5–TM which releases and then opens the circuit of relay 5–TM1. Relays 5–TM and 5–TM1 are both slow to release to measure off a time interval during which the desk may accept the call. If the call is accepted, relay 6–CA operates before relay 5–TM1 releases and closes a locking circuit for relay 5–TM1. If relay 6–CA does not operate, relay 5–TM1 releases after an interval, in turn releasing relay 5–E1. With relay 5–TM1 released, ground is connected over a front contact of relay 5–RC and a back contact of relay 6–MR to conductor 602 leading to the register and pulsing circuit 603, operating relay 6–DP in that circuit to prevent the transmission of the called line designation which has been registered therein by the marker and to restore that circuit to normal. Relay 6–DP in turn grounds conductor 604, closing a circuit over front contact of relay 5–RC to battery through the left winding of relay 6–MR. Relay 6–MR operates and locks in a circuit from battery through its right winding over its own front contact and a front contact of relay 5–RC to ground.

Relay 6–MR opens the locking circuit of relay 5–TC causing that relay to release. It also opens the circuit of relay 6–DP which releases and opens the circuit to the left winding of relay 6–MR. Relay 5–TC in releasing opens the circuit of relay 5–RC which releases slowly. It also disconnects ground from conductor 1100 to permit relay 11–AA00 to release and disconnect the trunk from the observing circuit. The release of relay 5–RC releases relay 6–MR.

If the desk is still idle after relay 5–RC releases, relays 5–PI, 5–TM, 5–TM1 and 6–TCO reoperate to prepare the observing circuit and the connector circuit for receiving a new call.

If the observing circuit has received an indication that the desk is idle, causing the operation of relays 5–PI, 5–TM, 5–TM1 and 6–TCO, and the desk becomes busy before a call is originated, the desk reverses the connection of ground and battery to conductors 1300 and 1301 operating relay 13–PB which disconnects ground from conductor 1208 and connects ground to conductor 1214. Disconnection of ground from conductor 1208 causes relay 5–PI to release while the connection of ground to conductor 1214 operates relay 6–DP in the register and pulsing circuit 603. The operation of relay 6–DP restores the circuit 603 and operates relay 6–MR starting the recycle operation described above. The release of relay 5–PI opens the circuit of relay 13–LB to prevent the transmission of a seizure signal to the desk. Relay 5–PI in releasing also opens the circuit of relay 6–TCO to cause that relay to start releasing.

If a call is originated during the release time of relay 6–TCO and relay 5–TC is operated, relay 5–TC closes a holding circuit for relay 6–TCO under the control of relay 5–TM. The operation of relay 5–TC opens the circuit of relay 5–TM and that relay releases slowly followed by the slow release of relays 5–TM1 and 6–TCO. Since no seizure signal can be sent to the desk and no call-accepted signal can be received, relay 6–CA is not operated and relay 5–TM1 completes its release. If relay 6–TCO releases before a new call is originated, it causes the release of relays 5–TM and 5–TM1. Relay 6–TCO in releasing restores the selection circuit to normal.

As previously mentioned, certain calls, such as test calls, are not observed even though they are extended over a trunk circuit which is wired to the service observing connector. In this case, the marker operates relay 10–NOB. Relay 10–NOB connects ground to conductor 1213 operating relay 6–NB over a front contact of relay 6–TCO. Relay 6–NB locks to ground over its front contact and front contacts of relays 5–TC and 5–TM. Relay 6–NB opens the circuit of relay 13–LB to prevent transmitting a seizure signal to the desk. When relay 5–TC operates, relays 5–TM and 5–TM1 release, in turn releasing relay 5–E1. Relay 6–NB operates relay 6–DP of the register and pulsing circuit, in turn operating relay 6–MR. The release of relays 5–TC, 5–RC, 6–MR, etc. takes place as previously described, placing the observing connector in condition to pick another trunk.

*Connections between trunk circuit and service observing circuit*

With relay 11–AA00 operated, conductors 725 and 726, which connect the tip and ring conductors of the trunk with the outgoing sender, are extended over contacts of relay 11–AA00, conductors 1225 and 1226, back contacts of relays 5–CH and 5–WO, conductors 501 and 502, back contacts of relay 13–CA2, condensers 13–TC and 13–RC, to grids of tube 13–V1T, the voice currents being transmitted by tube 13–V1T through repeating coil 13–T and conductors 1304 and 1305 to the observing desk.

The sleeve conductor 712 of the trunk is extended over a contact of relay 11–AA00, conductor 1212, back contact of relay 5–CH, back contact of relay 5–WO, to the left grid of tube 5–ET. Conductor 723 which is connected with the winding of the auxiliary sleeve relay 7–S1 and the control circuit therefor is extended over a contact of relay 11–AA00, conductor 1223, back contact of relay 5–CH to the right grid of tube 5–ET. Conductor 720, which is connected as previously traced to the make-busy conductor 727, and conductor 722, which is connected with the left winding of relay 7–D, are extended over front contacts of relay 11–AA00, conductors 1220 and 1222, back contacts of relay 5–CH to the two sides of a contact of relay 5–T. Conductor 721, which is grounded when the supervisory relay 7–C5 is operated, is extended over a contact of relay 11–AA00, conductor 1221, back contact of relay 5–CH, back contact of relay 5–WO to the right grid of tube 5–MT. Conductor 705, which is connected to the operating circuit of the outsender link hold magnet, is extended over a front contact of relay 11–AA00, conductor 1205, back contact of relay 5–CH, back contact of relay 5–WO to a network associated with the grid of tube 5–HMT. Conductor 724, which is connected to the right winding of the overflow relay 7–OF, is extended over a front contact of relay 11–AA00, conductor 1224, back contact of relay 5–CH to the network associated with the grid of tube 5–OFT.

*Trunk identification*

After the call has been accepted, a trunk identifier circuit is connected at the desk and ground and battery are reversed on conductors 1304 and 1305 operating relay 13–D. Relay 13–D, in operating, connects ground over its front contact and the front contact of relay 12–ST2 to conductor 1227 completing a circuit over back contact of relay 5–PCO and front contact of relay 6–CA, winding of relay 5–D1 to battery supplied to conductor 1238 from the trunk identification circuit 1230. Relay 5–D1 operates in this circuit and locks to ground over its own front contact and a back contact of relay 5–PCO. Relay 5–D1, in operating, connects ground to conductor 605 leading to the trunk identification circuit 1230 to operate the relay in that circuit which connects the trunk identifying relays to conductors 1240 to 1259 so that the identifying relays are operated under the control of relay 11–AA00. This relay also operates relay 13–DC over conductor 1215. Relay 13–DC disconnects conductors 1300 and 1301 from the windings of relays 13–ST and 13–PB causing these relays to release. However, relay 12–ST1 is held operated at this time over conductor 1228, front contact of relay 5–D1, front contact of relay 5–TC to ground. Relay 13–DC connects conductors 1300 and 1301 over its front contacts, conductors 1315 and 1316, front contacts of relay 6–ST3, back contacts of relay 5–PCO and conductors 1231 and 1232 to the trunk identification circuit 1230. Relay 5–D1 connects ground to conductor 1217 to start the interrupter and connects interrupted ground on conductor 1234 to conductor 1235 leading to the trunk identification circuit 1230 to operate the pulse generating relay of that circuit. In addition, relay 5–D1 connects ground to conductor 1218 to control the pulse counting relays. The trunk identification circuit 1230 then transmits the trunk designation to the desk by means of code pulses in the manner described in the above-identified Rosene patent. When the transmission has been completed, the trunk identification circuit 1230 connects ground to conductor 1216, completing a circuit over front contacts of relays 5–D1 and 5–TC to battery through the winding of relay 5–PCO. Relay 5–PCO locks to ground over a front contact of relays 5–TC and 5–PCO and disconnects the trunk pulsing conductors of the trunk identification circuit from conductors 1300 and 1302. It also releases relay 5–D1 and establishes a new holding circuit for relay 12–ST1 extending from the winding of relay 12–ST1 over conductor 1228, front contact of relay 5–PCO, conductor 1227, front contact of relay 12–ST2, front contact of relay 13–D to ground.

Relay 5–D1, in releasing, disconnects ground from conductors 1216, 1217, 1218, 605 and 1235 to permit the trunk identification circuit 1230 to restore to normal. In addition, it disconnects ground from conductor 1228. Disconnection of ground from conductor 605 releases the connector relays of the trunk identification circuit 1230 which in turn releases relay 13–DC. Relay 13–DC restores the connection of conductors 1300 and 1301 to the windings of relays 13–PB and 13–ST. Relay 13–ST immediately reoperates to reclose the original operating circuit for relay 12–ST1, relay 12–ST1 being slow to release to cover the interval between the release of relay 13–DC and the reoperation of relay 13–ST. When the trunk number has been received at the desk, the connection of battery and ground to conductors 1304 and 1305 is restored and relay 13–D releases. If, for any reason, the trunk identification circuit 1230 fails to complete pulsing or fails to ground conductor 1216, a timing circuit at the desk functions and after an interval restores the connection of battery and ground to conductors 1304 and 1305 releasing relay 13–D. Relay 13–D released, connects ground to conductor 1237 completing a circuit over front contacts of relays 5–E1, 5–D1 and 5–TC to battery through the winding of relay 5–PCO. Relay 5–PCO operates and performs the same functions as above described.

*Transmission of observing signals to desk—AMA*

The three pairs of conductors 1300—1301, 1302—1303 and 1304—1305 are connected to ground and battery at the desk through the windings of sensitive, marginal and differential relays. These relays receive all of the various signals from the observing circuit and convert them into the proper lamp signals. During the time that conductors 1300 and 1301 are used for transmitting the trunk number, the trunk identifier at the desk maintains a simulated seizure signal at the desk. The resistances of resistors 13–AD, 13–AD1, 13–AA and 13–AB are selected to compensate for the resistance of the conductors connecting the observing equipment with the desk. If necessary, an amplifier may be inserted between the tube 13–V1T and repeating coil 13–T to improve monitoring.

When observations start, and after the trunk identification has been completely transmitted, conductors 1300 and 1301 are connected together by a low resistance bridge extending as previously traced from conductor 1300, back contact of relay 13–DC, right winding of relay 13–PB, front contact of relay 13–LB, left winding of relay 13–ST, left winding of relay 13–PB, back contact of relay 13–DC to conductor 1301. Conductors 1302 and 1303 are connected together by a low resistance bridge extending from conductor 1302, upper right winding of repeating coil 13–T1, front contact of relay 13–ST1, resistor 13–AB, conductor 1307, front contact of relay 6–ST3, back contact of relay 5–M, front contact of relay 5–E1, front contact of relay 5–TC, conductor 1306, resistor 13–AA, front contact of relay 12–ST1, lower right winding of repeating coil 13–T1 to conductor 1303. Conductors 1304 and 1305 are connected together by the high resistance bridge, previously traced.

Ground is present on conductors 712 and 723 at the time the service observing circuit is connected with the trunk. Ground on conductor 712 is extended as previously traced to conductor 1212 and the left grid of tube 5–ET while ground on conductor 723 is extended to conductor 1223 and the right grid of tube 5–ET. These grids are normally held at cut-off by means of battery through appropriate resistors. When ground is connected to conductors 1212 and 1223, both sides of tube 5–ET become conducting and relays 5–E and 5–S operate. Relay 5–S in operating connects high potential positive battery through resistor 5–RX, front contact of relay 5–S, front contact of relay 5–E1, front contact of relay 6–CA, conductor 1310 and thence in parallel through resistor 13–U, front contact of relay 12–ST2, and the left winding of relay 13–D to conductor 1304 and through resistor 13–U1 to conductor 1311 and, as above traced, through the right winding of relay 13–D to conductor 1305.

When the sender is attached, as indicated by the operation of the link hold magnet, ground is connected to conductor 705 which extends as previously traced to the grid of tube 5–HMT causing the operation of relay 5–HM. Capacitor 5–SO associated with the grid of tube 5–HMT provides a time-delay action to prevent transient voltages on conductor 705 from operating relay 5–HM. With relay 5–HM operated, the left winding of repeating coil 13–T1 is short circuited to prevent noise passing to the observer at the desk. This shunt circuit may be traced from the upper left winding of repeating coil 13–T1, back contact of relay 13–TRF, conductor 1321, front contact of relay 5–HM, conductor 1322, back contact of relay 13–TRF, to the lower left winding of repeating coil 13–T1. With relay 5–HM operated, high potential positive battery is connected over a front contact of relay 5–HM, conductor 1308, resistor 13–X to conductor 1306 and thence to conductor 1303 and in parallel therewith through resistor 5–TX, front contact of relay 6–ST3, to conductor 1307 and thence to conductor 1302 as a sender attached signal to the desk. Relay 5–HM also connects battery through resistor 6–OBR over front contacts of relays 5–HM and 5–E in parallel with the winding of relay 6–OB to make that relay slow to release under certain conditions.

If the sender receives an indication that the call cannot be completed at the distant office, it connects battery to conductor 723 operating relay 7–OF on its left winding. Ground is connected at this time over front contacts of relays 7–S1 and 7–OF to conductors 724 and 1224 and the right winding of relay 7–OF to hold relay 7–OF operated and causing tube 5–OFT and relay 5–OF to operate. With relay 5–OF operated, ground is connected over a front contact of relay 5–RC and a front contact of relay 5–OF to the grid of tube 5–OFT to hold relay 5–OF operated. With relay 5–OF operated, a circuit is closed from ground over back contacts of relays 5–IM and 5–T1, front contact of relay 5–CA, front contact of relay 5–OF to battery through the winding of relay 6–OB. Relay 6–OB operates and connects ground to the right grid of tube 5–MT to operate relay 5–M. Relay 5–OF, in operating, connects ground to conductor 1217 to start the interrupter included in the trunk identification circuit 1230 and closes the circuit from conductor 1234, to which the interrupter connects interrupted ground, over the front contact of relay 5–OF, winding of relay 5–CS, front contact of relay 5–OF, resistor 5–CSR to battery. Therefore relay 5–CS is operated intermittently. With relay 6–OB operated, each time that relay 5–CS releases, conductors 1306 and 1307 are connected together closing a low resistance bridge across conductors 1302 and 1303. Each time that relay 5–CS operates, resistors 13–X and 5–TX are included in the bridge across conductors 1302 and 1303 thereby creating a flashing lamp signal at the service observing desk. Conductors 501 and 502 are connected over back contacts of relay 5–WO and 5–CH to conductors 1225 and 1226 and thence over contacts of connector relay 11–AA00 to conductors 725 and 726, back contacts of relay 7–TT to conductors 707 and 708 leading to the trunk conductors at the distant office to maintain a transmission path to the observing desk from the distant office so that tone signals may be heard by the observer. The distant office is prevented from releasing by a low resistance bridge in the sender circuit across conductors 725 and 726.

If the outgoing trunk is an intertoll trunk, the trunk connector relay similar to relay 11–AA00 operates relay 5–IT. With relay 5–IT operated, a bridge across the outgoing conductors 501 and 502 is opened and the outgoing trunk is not held. This bridge may be traced from conductor 501, back contact of relay 5–IT, front contact of relay 6–OB, back contact of relay 5–OF, relay winding 5–CS, back contact of relay 5–OF, front contacts of relays 6–OB, 5–TC, 6–CA, back contacts of relays 5–T1, 5–IT to conductor 502. This bridge is used to hold the distant office connection on other outgoing trunks when the calling subscriber disconnects as hereinafter described. A bridge is also connected across conductors 1220 and 1222 for outgoing intertoll-trunks when relay 5–S releases due to calling subscriber disconnect. This bridge makes the trunk busy to incoming calls and may be traced from conductor 1220, back contact of relay 5–CH, front contacts of relay 5–E1 and 5–IT, back contacts of relays 5–S and 5–CH to conductor 1222.

When the calling subscriber disconnects in response to the overflow tone, relay 7–S releases, opening the locking circuit of relay 7–S1, thereby removing ground from conductor 723. Relay 7–S1 is slow to release and after a brief interval opens its contact to remove ground from conductor 712. Relay 7–S1, in releasing, disconnects relay 7–CS from the outgoing trunk conductors. Removal of ground from conductor 723 causes relay 5–S to release. With relay 5–S released, the high positive potential is removed from conductors 1304 and 1305 to give a disconnect indication to the desk. Relay 5–S, in releasing, closes a supplementary circuit for holding relay 6–OB. With relay 6–OB operated, ground is connected to the right grid of tube 5–MT to prevent the release of relay 5–M. The subsequent removal of ground from conductor 712 causes relay 5–E to release, closing a circuit from ground over the back contact of relay 5–E, front contact of relay 6–CA, back contact of relay 5–IM, back contact of relay 5–T1 to battery through the winding of relay 5–T. Relay 5–T operates in this circuit to initiate a timing operation. Relay 5–T, in operating, closes a locking circuit for itself which extends from battery through the winding of relay 5–T, back contact of relay 5–T1, front contacts of relays 5–T, 5–TC and 6–ST3 to ground.

Relay 5–T connects conductors 1220 and 1222 together over back contacts of relay 5–CH and a front contact of relay 5–T. Conductors 1220 and 1222 are connected, as previously traced, to conductors 720 and 722 and a circuit is completed from ground on make-busy conductor 727 and thence to conductor 720 which is connected to conductor 722 as above traced and to battery through the winding of relay 7–D. Relay 7–D operates and disconnects ground from conductor 700 and opens the circuit of relay 7–F to prevent the trunk from being selected while it is held by the service observing circuit.

Relay 5–T connects positive battery directly to the main anode of tube 5–TT and through resistor 5–R3 to condenser 5–C1. Condenser 5–C1 is connected through resistor 5–R1 to the control anode of tube 5–TT. The cathode of tube 5–TT is connected to ground through the right winding of relay 5–T1. Prior to the operation of relay 5–T, condenser 5–C1 is held discharged by a connection to ground through resistor 5–R2 and the back contact of relay 5–T. When relay 5–T operates, this discharge circuit is opened and condenser 5–C1 charges from the positive battery connection. When the charge on condenser 5–C1 reaches the breakdown potential of tube 5–TT that tube becomes conducting and operates relay 5–T1. Relay 5–T1 locks in a circuit from battery through its left winding, front contacts of relays 5–T1 and 5–RC to ground. Relay 5–T1, in operating, opens the locking circuits of relays 5–E1 and 5–T causing these relays to release.

Relay 5–T, in releasing, restores the discharge circuit to condenser 5–C1 and disconnects the positive battery supplied to the tube 5–TT. Relay 5–T also opens the connection between conductors 1220 and 1222 to permit relay 7–D to release and permitting reselection of the observed trunk.

The release of relay 5–E1 opens the loop circuit between conductors 1304 and 1305 to start the release of the desk position circuit.

When the sender completes its functions or is disconnected following a calling subscriber disconnect it disconnects ground from conductor 705 causing relay 5–HM to release. Relay 5–HM in releasing disconnects positive battery from conductors 1302 and 1303 as a sender disconnect signal to the desk.

The release of relay 5–HM opens the connection between conductors 1321 and 1322 and closes a circuit from ground over a front contact of relay 5–RC, back contact of relays 6–MR, 5–HM and 5–TM, front contact of relay 6–CA, conductor 1332 to battery through the winding of relay 13–TRF. Relay 13–TRF operates in this circuit extending the left windings of repeating coil 13–T1 to conductors 1327 and 1328, leading to the register and multifrequency pulsing circuit 603. In addition, relay 13–TRF connects ground to conductor 1318 operating a relay in the register and pulsing circuit 603 to initiate transmission by means of multifrequency pulses of the called line designation registered therein over conductors 1327 and 1328 through the repeating coil 13–T1 and over conductors 1302 and 1303 to the service observing desk. When the designation transmission has been completed, the register and pulsing circuit connects ground to conductor 604 completing a circuit over a front contact of relay 5–RC through the left winding of relay 6–MR to battery. Relay 6–MR operates and locks through its right winding under the control of relay 5–RC and opens the circuit of relay 13–TRF. Relay 13–TRF releases and restores the register and MF pulsing circuit to normal.

When the called subscribed answers, relay 7–CS operates, as previously described, connecting ground to conductor 721. Ground on conductor 721 is extended, as previously traced, to the right grid of tube 5–MT operating relay 5–M. With relay 5–M operated, the connection between conductors 1302 and 1303 extends, as previously traced, from conductor 1302 to conductor 1307 and thence over the front contact of relay 6–ST3 through resistor 5–TX, conductor 1308, resistor 13–X to conductor 1306 and thence to conductor 1303, the direct connection previously traced between conductors 1306 and 1307 being opened by the operation of relay 5–M. The change from a low resistance bridge across conductors 1302 and 1303 to a high resistance bridge across these conductors serves as an answer signal to the service observing desk.

If the call is not completed in the distant office and the calling subscriber disconnects, the release of relay 5–S operates relay 6–OB. Relay 6–OB, in operating, closes a bridge between conductors 1225 and 1226 extending from conductor 1225 over back contacts of relays 5–CH, 5–WO, and 5–IT, front contact of relay 6–OB, back contact of relay 5–OF, winding of relay 5–CS, back contact of relay 5–OF, front contacts of relays 6–OB, 5–TC, and 6–CA, back contacts of relays 5–T1, 5–IT, 5–WO, and 5–CH to conductor 1226. Supervisory signals received from the distant office cause relay 5–CS to operate and release at each signal, completing a bridge over a front contact of relay 6–OB and the back contact of relay 5–CS across conductors 1306 and 1307 to transmit the supervisory signals to the desk.

When the called subscriber answers and the observing operator determines whether or not the connection has been properly established, she disconnects by operating a release key at the desk. This key reverses the connection of battery and ground to conductors 1300 and 1301 operating relay 13–PB. Relay 13–PB, in operating, disconnects ground from conductor 1208 releasing relay 5–PI. In addition, ground and battery are removed from the conductor pairs 1302–1303 and 1304–1305.

The release of relay 5–PI opens the circuit of relay 5–TM1, which releases slowly and then opens the circuit of relay 13–LB. Relay 13–LB, in releasing, removes the short circuit around resistors 13–Y and 13–Y1 and the right winding of relay 13–ST to remove the seizure signal from trunk conductors 1300 and 1301 to permit the desk position to complete its release.

When relay 5–TM1 releases, it releases relay 5–E1. If relay 6–MR has operated to indicate that the called number has been transmitted, the release of relay 5–TM1 releases relay 5–TC which in turn opens the circuit of relay 5–RC but relay 5–RC releases slowly. Relay 5–TC release relays 5–PCO and 6–CA. Relay 6–CA in turn releases relay 6–OB, if operated. In addition, relay 5–TC disconnects ground from conductor 1100 so that relay 11–AA00 releases, disconnecting the observing circuit from the observed trunk and reoperates relay 5–CH to again test the observing conductors.

Relay 5–RC, in releasing, releases relay 5–OF, if operated. In addition, relay 5–RC releases relay 6–MR and relay 5–T1. The observing circuit and the observing connector and control circuit are now ready to observe on another call.

The release by the calling subscriber, in response to an overflow signal, has been previously described. If the calling subscriber releases in the absence of an overflow signal, relays 7–S, 7–S1 and 7–CS release in the manner above described. In the observing circuit relays 5–S and 5–E release as before. Relay 5–S operates relay 6–OB and since relay 5–OF is not operated, closes a bridge across conductors 501 and 502 which may be traced from conductor 501, over a back contact of relay 5–IT, front contact of relay 6–OB, back contact of relay 5–OF, winding of relay 5–CS, back contact of relay 5–OF, front contact of relay 6–OB, front contacts of relays 5–TC and 6–CA, back contacts of relays 5–T1 and 5–IT to conductor 502. Relay 5–E operates relay 5–T to start the timing operation which takes place as above described.

With relay 6–OB operated, if relay 5–CS does not operate in the above traced bridge circuit, a low resistance bridge is connected across conductors 1302 and 1303. If relay 5–CS does operate, the low resistance bridge is changed to a high resistance bridge to transmit to the desk the corresponding supervisory signal. If the calling subscriber operates the switchhook intermittently, relay 7–S operates and releases intermittently, disconnecting ground from conductor 723 but relay 7S1 is slow to release and remains operated. The first removal of ground from conductor 723 causes relay 5–S to release and relay 5–S closes a circuit for operating relay 6–OB if relay 5–IT is not operated. Relay 6–OB closes the above-traced bridge circuit between conductors 501 and 502 and relay 5–S intermittently opens the high potential connected in simplex to conductors 1304 and 1305 to indicate to the observing operator that the calling subscriber is flashing.

*Intermarker operation—AMA*

Some of the outgoing AMA trunks extend to other switching units in the same building where they appear as incoming trunks and are connected through the other switching unit to trunks outgoing to remote offices. Therefore, it is not desirable to hold such trunks after the calling subscriber disconnects. If such a trunk is wired for observation, a relay, like relay 11–AA00, connects ground to conductor 503 operating relay 5–IM.

Relay 5–IM opens the circuit of the relay 6–OB to prevent the connection of relay 5–CS across conductors 501 and 502. With relay 5–IM operated, relay 5–E1 is locked over front contacts of relays 5–E1, 5–TM1 and 5–IM to ground either over the back contact of relay 5–WO and a front contact of relay 5–TM1, or over the back contact of relay 6–MR. When the calling subscriber disconnects, relay 5–E releases as previously described. With relay 5–IM operated, the release of relay 5–E closes a circuit over front contacts of relays 6–CA and 5–IM to battery through the winding of relay 5–WO operating relay 5–WO. Relay 5–WO, in operating, disconnects the tip and ring conductors of the trunk, which have been extended to conductors 1225 and 1226 by the operation of the trunk connect relay, from conductors 501 and 502 thereby opening the monitoring circuit leading to the observing desk. It also disconnects the sleeve conductor, which has been extended to conductor 1212, from the grid of tube 5–ET. In addition, relay 5–WO opens the grid circuit of the tube 5–HMT causing relay 5–HM to release. For this type of trunk no circuit is provided for relay 5–S and the high positive potential supplied to conductor 1310 for the simplex circuit over conductors 1304 and 1305 extends by way of a front contact of relay 5–IM and a back contact of relay 5–WO instead of by way of a front contact of relay 5–S. The operation of relay 5–WO opens this simplex circuit. Relay 5–WO also disconnects the right grid of tube 5–MT from conductor 1221 and connects direct ground thereto, operating relay 5–M to perform the functions previously described. Relay 5–WO also opens one of the locking circuits for relay 5–E1 so that relay 5–E1 will be released as soon as relay 6–MR operates following the transmission of the called line designation to the desk.

The signals from the AMA service observing circuit to the service observing desk may be summarized as follows:

Seizure (relay 6–CA operated):
- Low-resistance bridge on 1300—1301
- High-resistance bridge on 1304—1305
- Low-resistance bridge on 1302—1303
- +130-volt simplex to 1304—1305

Sender attached:
- +130-volt simplex to 1302–1303

Overflow:
- Alternate low- and high-resistance bridge on 1302—1303

Called line answers:
- Change from low-resistance bridge to high-resistance bridge on 1302—1303

Calling line disconnects:
- High-resistance bridge and +130-volt simplex removed from 1304—1305

*CAMA trunk*

As previously described, when the service observing desk wishes to observe on CAMA calls, relay 13–CAM is operated over trunk conductors 1302 and 1303, in turn operating relays 13–CA1, 13–CA2 and 13–CMA while the service observing equipment is idle. Relay 13–CMA operated connects ground to conductor 1202 to indicate to the marker that CAMA calls are to be observed.

When the service observing equipment is placed in service, relays 13–ST and 13–PB operate, followed by relays 12–ST1 and 12–ST2.

As described in connection with the AMA call, relay 12–ST1 disconnects conductors 1302 and 1303 from the class selection relays and connects them to conductors 1306 and 1307 leading to the service observing circuit and relays 12–ST1 and 12–ST2 open the battery and ground connections to conductors 1304 and 1305 which are used for trunk reduction and extend these conductors to conductors leading to the service observing circuit.

With relay 13–CA2 operated, the operation of relay 12–ST2 connects ground over the front contact of relay 12–ST2, front contact of relay 13–CA2, to conductor 1260, operating relay 3–ST3 in the CAMA observing circuit. Relay 3–ST3 closes the heater circuits for tubes 3–ET, 3–MT and 3–MF to prepare them for operation. In addition, relay 3–ST3 operates relay 3–CH over a back contact of relay 3–TC to connect the observing leads 1264, 1281, 1273, 1274, and conductors 301 to 306 leading to the CAMA sender to positive battery through the winding of relay 3–MT to test these conductors for false ground or battery. Relay 3–ST3 also closes an obvious circuit for operating relay 3–PC1.

When the position is idle and waiting for a call, relay 13–PB releases, connecting ground to conductor 1208 which, with relay 3–ST3 operated, is extended over back contact of relays 3–RC and 4–TM to the right grid of tube 3–MT, operating relay 3–PI. Relay 3–PI, in operating, closes a bridge around the back contacts of relays 3–RC and 3–TM in its operating circuit to hold it operated independent of relays 3–RC and 3–TM. Relay 3–PI closes a circuit from ground over a back contact of relay 3–TC, front contact of relay 3–PI, back contact of relay 4–LO to battery through the winding of relay 4–TM. Relay 4–TM operates and closes an obvious circuit for relay 3–TM1. With relay 4–TM operated a circuit is closed from battery through the winding of relay 4–TCO, back contact of relay 4–LO, back contact of relay 3–RC, front contact of relay 3–PI, front contact of relay 4–TM, conductor 400 to ground over the back contact of relay 5–TM in the AMA observing circuit. Relay 4–TCO operates in this circuit and connects ground over conductor 1319 to the connector and control circuit where, since relay 13–CA2 is operated, relay 13–MKC is operated. The operation of relay 13–MKC prepares the connector circuit to connect CAMA trunks for observation. Relay 4–TCO, in operating, connects ground to the right grid of tube 3–ET operating relay 3–ROP. With relay 4–TCO operated, ground is connected over back contacts of relays 3–TC and 3–RC, front contact of relay 4–TCO to conductor 1333, operating relay 13–CO which in turn operates relay 13–CO1. Relay 4–TCO also closes a front contact in parallel with the front contact of relay 3–PI in the circuit of relay 4–TM. The service observing circuit and the service observing connector and control circuit are now ready to receive a call for observation.

When the marker is connected with the trunk circuit of Figs. 1 and 2, relay 2–TF is operated as previously described, connecting ground to conductor 220. Assuming that the trunk circuit of Figs. 1 and 2 also appears on frame O, ground on conductor 220 extends through resistors 10–FA6, 10–E16, varistor 10–T16, front contact of relay 13–MKC to the grid of tube 10–FRTO, causing tube 10–FRTO to become conducting and operate relay 10–FR00. When the connector was normal, relays 10–FC and 10–FC1 operated as previously described, in turn operating relays 10–FB and 10–FB1 which lock under the control of relays 13–CO and 13–CO1. As soon as relay 10–FR00 operates it opens the circuit of relay 10–FC which releases and completes a circuit from battery over the back contact of relay 10–FC, front contact of relay 10–FB, conductor 1002, winding of frame auxiliary relay 8–FA00, back contact of relay 8–FA00, front contact of relay 10–FR00, back contacts of all of the even frame auxiliary relays 8–FA18 to 8–FA00, conductor 801 to ground over the front contacts of relays 13–CO1 or 13–CO and 12–ST2. Relay 8–FA00 operates and locks directly to ground over conductor 801.

With relay 8–FA00 operated, ground is connected over conductor 1209 and the front contact of relay 4–TCO to battery through the winding of relay 3–TC. Relay 3–TC operates and locks under the control of relay 3–TM1 and 4–MR, operating relay 3–RC. With relay 4–TM operated, relay 3–RC operates relay 3–E1. Relay 3–TC releases relay 3–CH to disconnect the observing leads from the winding of relay 3–MT and connect them to the observing circuit. With relay 3–CH released, battery is connected over the back contact of relay 3–CH to conductor 300 and ground is connected over the front contact of relay 3–TC and the back contact of relay 3–CH to conductor 1150 completing a circuit from battery over conductor 300, winding of relay 9–CTC00, front contact of relay 8–FA00, front contact of relay 13–MKC, back contacts of the even trunk connector relays 11–CA98 to 11–CA00 to ground on conductor 1150. Relay 9–CTC00 operates in this circuit preparing the circuits for selecting the individual trunk on which the call has appeared. With relay 9–CTC00 operated, conductor 220 is connected over a front contact of relay 9–CTC00 to the grid of tube 10–TKTO operating relay 10–TKO. Relay 10–TKO completes a circuit from battery on conductor 300, winding of relay 11–CA00, conductor 902, front contact of relay 9–CTC00, conductor 1004, front contact of relay 10–TKO to ground, operating the connector relay 11–CA00 to connect the trunk to the observing circuit. With relay 11–CA00 operated, the circuit of relay 9–CTC00 is opened and that relay releases. As previously described, relay 11–CA00 connects together one of the conductors 1240 to 1249 and one of the conductors 1250 to 1259 to prepare for the trunk identification. In addition, relay 11–CA00 connects conductors 213, 214, 224 and 221 of the trunk to conductors 1273, 1274, 1264 and 1281 leading to the CAMA observing circuit.

When relay 8–FA00 operated, it closed a circuit from ground, front contacts of relays 13–CO and 13–CO1 in parallel, windings of relays 10–OBS and 10–NOB, conductor 1003, front contact of relay 8–FA00, conductor 802 to the marker as described in connection with the AMA call. If the call is to be observed, relay 10–OBS operates in series with relay 15–TOB in the marker. Relay 15–TOB causes the transfer of the called line designation to the register and pulse circuit 603. Relay 10–OBS operated, connects ground to conductor 1210, completing a circuit over a front contact of relay 4–TCO, back contact of relay 4–NB, front contact of relay 3–PI, conductor 1330 to battery through the winding of relay 13–LB. Relay 13–LB operates and closes a shunt around resistors 13–Y and 13–Y1 and the right winding of relay 13–ST to transmit a seizure signal to the service observing desk over conductors 1300 and 1301.

If the call is accepted by the desk, battery and ground are connected to the conductor pairs 1302—1303 and 1304—1305. Conductors 1304 and 1305, at this time, are connected together over a circuit extending from conductor 1305, lower right winding of repeating coil 13–T, resistor 13–AD1, right winding of relay 13–D, front contact of relay 12–ST2, conductor 1309, front contact of relay 3–ST3, front contact of relay 3–E1, back contact of relay 3–CA, conductor 1312, windings of relay 13–FCA, front contact of relay 12–ST1, left winding of relay 13–D, resistor 13–AD, upper right winding of repeating coil 13–T to conductor 1304. Relay 13–FAC operates in this circuit and closes a circuit from ground over its front contact, front contact of relay 12–ST2, conductor 1211, front contact of relay 3–TC to battery through the winding of relay 3–CA. Relay 3–CA operates, indicating that the call has been accepted, and locks under the control of relay 3–TC.

In the manner described for the AMA observing circuit, the operation of relay 3–TC opens the circuit of relay 4–TM which releases slowly and, when released, opens the operating circuit for relay 3–TM1, which is also slow to release. Assuming that relay 3–CA operates before relay 3–TM1 releases, relay 3–CA closes a locking circuit for relay 3–TM1, over front contacts of relays 3–TM1, 3–CA and 3–PI. Until relay 4–TM releases, a holding circuit is provided for relay 13–LB over conductor 1331 and front contacts of relays 3–PI and 4–TM to ground. When relay 3–CA is operated, it connects ground over the front contact of relay 3–CA and the front contact of relay 3–PI to conductor 1330 to hold relay 3–LB operated. With relay 3–CA operated, the connection over conductors 1304 and 1305 extends as previously traced to conductor 1309, over front contacts of relays 3–ST3, 3–E1 and 3–CA to conductor 1311 and through resistors 13–U1 and 13–U, front contact of relay 12–ST2, to the left winding of relay 13–D and back to conductor 1304.

The operation of relay 3–TC disconnects ground from conductor 1333 causing relay 13–CO to release slowly, followed by relay 13–CO1. The release of relays 13–CO and 13–CO1 releases the selection relays of the connector circuit in the manner previously described, leaving relay 11–CA00 held under the control of the CAMA service observing circuit. The circuit through the winding of relay 10–OBS is opened, terminating the position-idle signal to the marker and releasing relay 10–OBS.

When relay 3–TC operates, relay 4–TCO is held operated over a circuit extending from battery through the winding of relay 4–TCO, back contact of relay 4–LO, front contact of relay 4–TM, front contact of relay 3–TC to ground. When relay 3–RC operates, the operating circuit for relay 4–TCO is opened and when relay 4–TM releases the holding circuit is also opened and relay 4–TCO also releases.

With relay 4–TCO released, ground is removed from conductor 1319 releasing relay 13–MKC. With relay 4–TCO released, a circuit is also closed from battery through the winding of relay 4–LO, back contact of relay 4–TCO, front contact of relay 3–TC to ground over a back contact of relay 4–MR. When relay 4–TCO releases, relay 3–ROP is held operated over a back contact of relay 3–CH and conductor 301 leading to the CAMA sender.

After the call has been accepted, causing the operation of relay 3–CA, the trunk identifier at the service observing desk is connected and the desk circuit reverses the connection of battery and ground to conductors 1304 and 1305. Relay 13–D operates in response to this reversal, connecting ground to conductor 1227 to complete a circuit in the observing circuit over a back contact of relay 4–PCO, front contact of relay 3–CA, winding of relay 4–D1 to battery supplied to conductor 1238 by the trunk identification circuit 1230. Relay 4–D1, in operating, locks to ground over a back contact of relay 4–PCO and connects ground to conductor 402 to operate connector relays in the trunk identification circuit 1230 which connect the identification register relays to conductors 1240 to 1259 to set up a registration of the trunk identity. The connector relays in turn operate relay 13–DC. Relay 13–DC disconnects conductors 1300 and 1301 from the windings of relays 13–ST and 13–PB and extends them over front contacts of relay 13–DC, conductors 1315 and 1316, front contacts of relay 3–ST3, back contacts of relay 4–PCO, conductors 1231 and 1232 to the trunk identification circuit 1230.

With relays 13–DC and 4–D1 operated, ground is connected over a front contact of relay 3–TC, front contact of relay 4–D1, conductor 1228 to the winding of relay 12–ST1 to hold that relay operated while relay 13–ST is disconnected. Relay 4–D1 also connects ground to conductors 1217 and 1218 and connects conductors 1234 and 1235 together to cause the trunk identification circuit 1230 to start pulsing the trunk identification to the service observing desk. When the trunk identification circuit 1230 has finished pulsing, it connects ground to conductor 1216, completing a circuit over a front contact of relay 4–D1, front contact of relay 3–TC to battery through the winding of relay 4–PCO. Relay 4–PCO locks to ground over a front contact of relay 3–TC and disconnects conductors 1315 and 1316 from conductors 1231 and 1232, opening the pulsing circuit. Relay 4-PCO also closes an auxiliary holding circuit for relay 12-ST1 extending from battery through the winding of relay 12-ST1, conductor 1228, front contact of relay 4-PCO, conductor 1227, front contact of relay 12-ST2, front contact of relay 13-D to ground. Relay 4-PCO also opens the operating and locking circuits for relay 4-D1 causing that relay to release and open the circuits above traced leading to the trunk identification circuit 1230 to permit that circuit to restore to normal. When the trunk identification circuit 1230 is restored to normal, relay 13-DC releases, restoring the connection of relays 13-ST and 13-DB to conductors 1300 and 1301. When the identification is completed at the service observing desk, the connection of battery and ground to conductors 1304 and 1305 is restored releasing relay 13-D. If, for any reason, the trunk identification circuit 1230 fails to complete pulsing or fails to ground conductor 1216, a timing circuit at the desk functions, and after an interval, restores the connection of battery and ground to conductors 1304 and 1305, releasing relay 13-D. Relay 13-D released, connects ground to conductor 1237 completing a circuit over front contacts of relays 3-E1, 4-D1 and 3-TC to battery through the winding of relay 4-PCO. Relay 4-PCO operates and performs the same functions as above described.

It will be remembered that, when the trunk of Figs. 1 and 2 was seized, relay 1-AE operated, in turn operating relay 2-B. With relay 2-B operated, ground is connected to conductor 224 which is extended over a front contact of relay 11-CA00, conductor 1264, back contact of relay 3-CH, back contact of relay 3-WO to the grid of tube 3-ET, operating relay 3-E. Relay 3-E remains operated as long as the trunk is held, and opens the circuit of relay 3-WO to prevent its operation when relay 3-CA operates.

The CAMA sender is connected directly to the CAMA service observing circuit by means of a relay in the sender operated by the marker when the call is to be observed. When the CAMA sender is attached to the trunk circuit, conductor 306 is grounded, completing a circuit over a back contact of relay 3-CH, front contact of relay 3-ST3, back contact of relay 3-WO to battery through the winding of relay 3-SA. Relay 3-SA operates in this circuit and connects the output of tube 3-MF to conductors 1321 and 1222 which are connected over back contacts of relay 13-TRF, through the repeating coil 13-T1 to the observing trunk conductors 1302 and 1303. Tube 3-MF is of the cathode-follower type and its grids are connected through condensers 3-TC and 3-RC to conductors 307 and 308 leading to the CAMA sender so that the service observing desk may receive the MF pulses of the calling number designation from the CAMA position circuit via the sender circuit. The service observing operator may hear the conversation when the CAMA operator requests the calling line number from the calling subscriber over a circuit which may be traced from conductors 213 and 214, front contact of relay 11-CA00, conductors 1273 and 1274, back contacts of relays 3-CH and 3-WO, conductors 311 and 312, front contacts of relay 13-CA2, capacitors 13-TC and 13-RC, cathode follower circuit 13-VIT, repeating coil 13-T to the desk over conductors 1304 and 1305. Relay 3-SA also connects high potential positive battery through resistor 3-TX, over a back contact of relay 3-WO, front contact of relay 3-ST3 to conductor 1307 and over the front contact of relay 3-E1, back contact of relay 3-M and a front contact of relay 3-TC to conductor 1306, conductors 1306 and 1307 being extended as previously traced to conductors 1302 and 1303 to transmit a sender-attached signal to the service observing desk.

When a CAMA sender calls for the CAMA position, it connects ground to conductor 303 completing a circuit over a back contact of relay 3-CH, front contacts of relays 3-ST3 and 3-E1, back contact of relay 3-WO to battery through the winding of relay 3-PC. Relay 3-PC operates in this circuit and locks to ground over a back contact of relay 3-WO, front contact of relay 3-E1 and its own front contact. The operation of relay 3-PC opens the circuit of relay 3-PC1, but that relay releases slowly to measure a time interval. When relay 3-PC1 releases, with relay 3-PC operated, a circuit is closed from battery through the winding of relay 3-PA, back contact of relay 3-PC1, front contact of relay 3-PC, back contact of relay 3-CH to conductor 302. When the position is attached, ground is connected to conductor 302 to operate relay 3-PA. Relay 3-PA is made slow to operate so that, if a position is attached at the time the sender calls for a position, there will be a slight delay before relay 3-PA operates. When relay 3-PA operates, it closes a circuit from ground over the front contacts of relays 3-PA, 3-ROP and 3-SA to battery through the winding of relay 3-PA1 operating the latter relay.

With relay 3-PC operated, until relay 3-PC1 releases, conductor 1309 is connected over front contacts of relays 3-ST3, 3-E1, 3-CA, 3-PC1 and 3-PC to conductor 1320 closing a temporary low resistance bridge across conductors 1304 and 1305 as a position-called signal. When relay 3-PC1 releases, this low resistance bridge is opened and conductor 1309 is connected with conductor 1320 over a high resistance bridge which may be traced over the front contacts of relays 3-ST3, 3-E1, 3-CA, conductor 1311 and resistors 13-U1 and 13-U. When relay 3-PA1 operates, it closes a connection between conductors 1311 and 1320 in shunt of resistors 13-U1 and 13-U reestablishing the low resistance bridge as a position-attached signal.

When the operator has received the number of the calling subscriber, she writes up the number on the key set of her position causing the designation to be transmitted by multifrequency pulses to the sender over conductors 307 and 308 which are connected so that the multifrequency pulses are also transmitted to the service observing desk over conductors 1302 and 1303. Errors in pulsing by the operator are detected and indicated by equipment at the desk.

If the operator realizes she had made an error and operates her reset key, ground is connected for a short period to conductor 304 completing a circuit over a back contact of relay 3-CH and a front contact of relay 3-PC, to battery through the winding of relay 3-RSX. Relay 3-RSX, in operating, connects high potential positive battery through resistor 3-RX over front contacts of relays 3-RSX, 3-E1 and 3-CA to conductor 1310 completing a simplex circuit through resistor 13-U to conductor 1304 and through resistor 13-U1, conductor 1311, front contacts of relays 3-CA, 3-E1 and 3-ST3, conductor 1309 to conductor 1305 as a register reset signal.

If the information received by the charging equipment is not satisfactory, it returns a signal to the CAMA sender to recall the operator. In response to this signal the sender flashes the lamp at the operator's position and removes ground from conductor 301 permitting relay 3-ROP to release. With relay 3-ROP released, ground is connected over a front contact of relay 3-SA and a back contact of relay 3-ROP to conductor 1217 to start the interrupter which forms part of the trunk identification circuit 1230. Interrupted ground is thereupon connected to conductor 1234 and with relay 3-ROP released, the winding of relay 3-PA1 is disconnected from the ground supplied by relay 3-PA and connected to conductor 1234 so that relay 3-PA1 is operated intermittently, alternately opening and closing the shunt around resistors 13-U1 and 13-U to flash a lamp at the service observing desk. In response to this reorder signal, the operator will operate the register reset key as above described.

Normally the CAMA position is released by the sender causing the removal of ground from conductor 302, releasing relays 3-PA and 3-PA1. The release of relay 3-PA1 opens the low resistance bridge across conductors 1304 and 1305 as a position-release signal.

If, because satisfactory information cannot be given the accounting equipment or, if for any other reason the operator wishes to release her position, she operates a position-disconnect key. The operation of the position-disconnect key removes ground from conductor 302 and connects ground to conductor 305. Removal of ground from conductor 302 releases relays 3–PA and 3–PA1, while ground connected to conductor 305 operates relay 3–PD over a back contact of relay 3–CH and a front contact of relay 3–PC. Relay 3–PD operated connects high potential positive battery to conductor 313 completing a simplex circuit through the windings of relays 13–ST and 13–PB to conductors 1300 and 1301 as a forced position-disconnect signal.

When the sender has completed its required functions, it opens conductors 301 to 306 thereby releasing relay 3–SA. Relays 3–ROP and 3–PD, if operated, are also released, but perform no function at this time. The release of relay 3–SA closes a circuit from ground over a front contact of relay 3–RC, back contact of relay 4–MR, back contacts of relays 3–SA and 4–TM, front contact of relay 3–CA, conductor 1332 to battery through the winding of relay 13–TRF. Relay 13–TRF operates and connects ground to conductor 1318 leading to the register and pulsing circuit 603 causing that circuit to transmit the called line number, registered therein by the marker, over conductors 1302 and 1303 to the service observing desk. With relay 3–SA released, battery is disconnected from conductor 1308 removing the simplex signal from conductors 1302 and 1303. Relay 3–SA in releasing also disconnects tube 3–MFT from the circuit over conductors 1302 and 1303. In addition, relay 3–SA opens the circuit of relay 3–PA1 and disconnects ground from conductor 1217 so that the release of relay 3–ROP will not cause a flashing signal such as previously described.

When the register and pulsing circuit 603 has completed its functions, it operates a relay which connects ground to conductor 404 and over the front contact of relay 3–RC to battery through the right winding of relay 4–MR. Relay 4–MR operates in this circuit and locks through its left winding under the control of relay 3–RC. Relay 4–MR, in operating, releases relay 13–TRF permitting the register and pulsing circuit 603 to restore to normal. When the called subscriber answers, relay 1–S or relay 2–T operates according to the termination of the call, either relay connecting ground to conductor 221. Ground on conductor 221 is extended over a front contact of relay 11–CA00 to conductor 1281 and thence to the left grid of tube 3–MT, operating relay 3–M. Relay 3–M opens the bridge across conductors 1302 and 1303 to transmit a called subscriber answer signal to the service observing desk. Relay 3–M will follow forward supervisory signals, including called subscriber disconnect, until the calling subscriber disconnects.

When the calling subscriber disconnects, relay 1–AE releases, in turn releasing relay 2–B, disconnecting ground from conductor 224 and releasing relay 3–E. When relay 3–E releases, the circuit of relay 3–WO is closed over a front contact of relay 3–CA, operating relay 3–WO. Relay 3–WO operated disconnects conductors 1273, 1274 and 1264 from the observing circuit. Relay 3–WO also opens the circuits of relays 3–SA and 3–PC to release these relays if the calling subscriber disconnects before the sender is released. Relay 3–WO operated also connects ground to the left grid of tube 3–MT, operating relay 3–M to open the bridge across conductors 1302 and 1303 as a calling subscriber disconnect signal.

When the operator at the desk wishes to release her position, she operates a key at the desk which reverses the connection of battery and ground to conductors 1300 and 1301, operating relay 13–PB. Relay 13–PB, in operating, opens the circuit of relay 3–PI causing that relay to release. Relay 3–PI, in releasing, opens the locking circuit of relay 3–TM1 permitting that relay to release slowly. It also opens the circuit of relay 13–LB causing that relay to release and open the low resistance bridge across conductors 1300 and 1301, as a check signal to the desk, to complete the release of the position circuit thereat.

When relay 3–TM1 releases, it releases relay 3–E1 and opens one locking circuit for relay 3–TC. Normally, the other circuit for relay 3–TC over back contacts of relays 3–WO and 4–MR will have been opened at this time and relay 3–TC will release. If the transmission of the called line number has not been completed, release of relay 3–TM1 connects ground over a front contact of relay 3–RC and a back contact of relay 4–MR to conductor 403 to operate relay 6–DP in the register and pulsing circuit 603 to stop the pulsing and connect ground to conductor 404 to operate relay 4–MR. Relay 4–MR, in operating, opens the locking circuit of relay 3–TC to permit that relay to release.

With relay 3–TC released, the circuit of relay 3–RC is opened and that relay releases slowly. Relay 3–TC also opens the locking circuit of relay 3–CA causing that relay to release. In addition, relay 3–TC disconnects ground from conductor 1150 to release the connector relay 11–CA00 and disconnect the trunk from the observing circuit. The release of relay 3–TC also permits relay 3–CH to reoperate to test the observing conductors. When relay 3–RC releases, relay 4–MR releases and the observing circuit returns to the awaiting-call condition.

If, due to delay at the service observing desk, a call is not accepted, that is, relay 3–CA is not operated before relay 3–TM1 releases, the release of relay 3–TM1 releases relay 3–E1 and connects ground to conductor 403 to block the register and pulsing circuit 603. The register and pulsing circuit then connects ground to conductor 404 to operate relay 4–MR. Relay 4–MR, in operating, releases relay 3–TC and disconnects ground from conductor 403. The release of relay 3–TC starts the release of relay 3–RC, disconnects ground from conductor 1150 to release the operated connector relay, such as relay 11–CA00, and reoperates relay 3–CH. Relay 3–RC, in releasing, releases relay 4–MR.

If there is an idle position at the service observing desk after relay 3–RC releases, relays 3–PI, 3–TM, 3–TM1 and 4–TCO reoperate to prepare the service observing circuit and connector circuit for a new call. If there is no idle position at the desk when relay 3–RC releases, the connection of battery and ground to conductors 1300 and 1301 will have been reversed and relay 13–PB operated disconnects ground from conductor 1208 to release relay 3–PI. Relay 3–PI, in releasing, restores the register pulsing circuit to normal and causes relay 4–TCO to release slowly.

If a call is originated before relay 4–TCO releases, relay 3–TC operates and holds relay 4–TCO until relay 3–TM releases. With relay 3–PI released, no seizure signal is transmitted to the service observing desk and the call cannot be accepted so that relay 3–CA also does not operate. If relay 4–TCO releases before a call is originated, the selection circuit is released. Relays 3–TM and 3–TM1 also release and the service observing circuit waits for a service observing position to become idle.

If the marker operates relay 10–NOB to indicate that the call is not to be observed, relay 10–NOB connects ground to conductor 1213, operating relay 4–NB. Relay 4–NB opens the operating circuit for relay 13–LB so that no seizure signal is sent to the service observing desk and therefore no call-accepted signal is returned. Relay 3–TM1 releases, following the release of relay 3–TM in response to the operation of relay 3–TC. With relay 3–TM1 released, relay 3–E1 also releases. The release of relay 3–TM1 also restores the register and pulsing circuit 603 to normal, which in turn operates relay 4–MR to release relay 3–TC and to restore the service observing circuit and connector circuit.

If, after the service observing circuit has been placed in the awaiting-call condition with relays 4–TM, 3–TM1 and 4–TCO operated, the desk becomes busy again so that relay 3–PI releases before a call is originated, relay 4–TCO is released to disable the selection circuit. The release of relay 4–TCO in turn releases relays 4–TM and 3–TM1 after which the circuit of relay 3–PI is reclosed to permit a new position idle signal to be received.

The signals transmitted to the service observing desk by the CAMA service observing circuit may be summarized as follows:

Seizure:
- Low-resistance bridge on 1300—1301
- High-resistance bridge aon 1304—1305
- Low-resistance bridge on 1302—1303

Sender attached:
- +130-volt simplex to 1302—1303

Sender calls CAMA position:
- Momentarily changes from high-resistance bridge to low-resistance bridge on 1304—1305

Position attached:
- Changes from high-resistance bridge to low-resistance bridge on 1304—1305

Register reset:
- +130-volt simplex to 1304—1305 momentarily

Position disconnect key operated:
- +130-volt simplex to 1300—1301 momentarily
- Low- to high-resistance bridge on 1304—1305
- +130-volt simplex removed from 1302—1303

Sender reorders position:
- Alternate low- and high-resistance bridge on 1304—1305

Sender and position released:
- Low- to high-resistance bridge on 1304—1305
- +130-volt simplex removed from 1302—1303

Called line answers:
- Low- to high-resistance bridge on 1302—1303

Calling line disconnects:
- High-resistance bridge removed from 1302—1303
- +130-volt off 1302—1303
- High-resistance bridge removed from 1304—1305

*Test of observing conductors*

If, during the time that relay 5–CH is operated, any of the observing conductors leading to the AMA observing circuit is falsely connected to battery or ground, relay 5–MT operates and connects ground to conductor 1236, completing a circuit over a back contact of relay 12–AR to battery through the winding of relay 12–AL. Relay 12–AL operates in this circuit and locks in a circuit from battery through its winding over a back contact of relay 12–AR to ground over its own front contact. Relay 12–AL operates an alarm (not shown) and opens the circuit of relay 12–ST1 causing that relay to release and release relay 12–ST2. The release of relays 12–ST1 and 12–ST2 puts the connector circuit, as well as the observing circuit out of service. Relay 12–AL also connects ground over a front contact of relay 13–ST, front contact of relay 12–AL to the trunk reduction circuit 1206 to hold that circuit in its set condition. The alarm may be silenced by operating key 12–ARK which operates relay 12–AR. Relay 12–AR opens the operating and locking circuits for relay 12–AL to silence the alarm and connects ground over a front contact of relay 13–ST and front contact of relay 12–AR to the trunk reduction circuit 1206 to hold that circuit in its set condition. Relays 12–AL and 12–AR also supply substitute locking circuits for the operated one of relays 13–CA1 and 13–MA1 to maintain the class selection.

Similiarly, if a false ground or battery appears on any of the observing circuits leading to the CAMA observing circuit relay 3–MT operates and connects ground to conductor 1236 to operate relay 12–AR.

*Individual service observing trunks for AMA and CAMA observations*

If there is enough AMA and CAMA traffic at a particular office to warrant it, a separate service observing trunk and control circuit may be used for making the two types of observations. Under this condition, there will be a control circuit such as shown in Fig. 13 individual to each of the service observing circuits, but the trunk selection circuit shown in Fig. 10, the trunk identification circuit 1230 and the register and pulsing circuit 603 will be common to both service observing circuits. Therefore, means is provided to prevent both service observing circuits attempting to use these common circuits at the same time, preference being given the the AMA observing circuit. For this purpose relay 4–LO is provided in the CAMA observing circuit and relay 6–LO in the AMA observing circuit.

When the AMA observing circuit is bidding for a call with relays 6–TCO, 5–TM and 5–TMI operated, ground is disconnected by relay 5–TM from conductor 400 to prevent the operation of relay 4–TCO in the CAMA observing circuit and thereby to prevent placing that circuit in the awaiting-call condition. Ground is connected over a front contact of relay 6–TCO to conductor 401 to operate relay 4–LO in the CAMA observing circuit. When relay 5–TC operates, following the operation of the frame select relay, a holding ground is connected over a back contact of relay 6–MR and a front contact of relay 5–TC to conductor 401 to hold relay 4–LO operated. When relay 5–TM releases, following the operation of relay 5–TC, ground is connected to conductor 400 but relay 4–TCO cannot operate since relay 4–LO is still held operated over conductor 401. When relay 6–TCO releases, relay 6–LO operates from a ground connected to conductor 401 over the back contact of relay 6–MR and front contact of relay 5–TC. Relays 4–LO and 6–LO are both held operated until relay 6–MR operates after the called-line number has been transmitted to the desk. If, at this time, the trunk identification has not been completed and relay 5–PCO is not operated, relays 6–LO and 4–LO will also be held operated over conductor 401, then grounded over a front contact of relay 5–TC, back contact of relay 5–PCO, front contacts of relays 5–TMI and 5–RC. When relays 6–MR and 5–PCO have both operated, ground is removed from conductor 401 and relays 4–LO and 6–LO both release. The release of relay 6–LO partially recloses the operating circuit for relay 6–TCO but that relay cannot operate until the AMA service observing circuit has been released. If there is an idle position waiting for a CAMA call, the release of relay 4–LO permits relay 4–TM to operate and since relay 5–TM is released at this time, relay 4–TCO also operates to bid for a CAMA call. With relay 4–TCO operated, ground is connected to conductor 401, operating relay 6–LO to block the AMA call observing circuit. After a trunk has been found, ground is connected over a back contact of relay 4–MR and a front contact of relay 3–TC to conductor 401 to hold relay 6–LO operated until the called line number has been transmitted to the desk, operating relay 4–MR, and until the trunk identification has been transmitted. When relay 4–TCO releases these grounds are also effective to operate relay 4–LO and to hold it operated.

What is claimed is:

1. In a telephone system, trunk circuits, control circuits common to said trunk circuits for controlling the establishment of connections to said trunk circuits, first connectors for connecting said control circuits with said trunk circuits, a service observing circuit, a second connector for connecting said service observing circuit with said trunk circuits and means responsive to the operation of one of said first connectors to connect one of said control circuits with one of said trunk circuits to operate said second connector to connect said service observing circuit with said one trunk circuit.

2. In a telephone system, trunk circuits, control circuits common to said trunk circuits for controlling the establishment of connections to said trunk circuits, first connectors for connecting said control circuits with said trunk circuits, a service observing circuit, a second connector for connecting said service observing circuit with said trunk circuits, means responsive to the operation of one of said first connectors to connect one of said control circuits with one of said trunk circuits to operate said second connector to connect said observing circuit with said one trunk circuit and preference means in said second connector responsive to the operation of a plurality of said first connectors to operate said second connector to connect with a preferred one of said trunk circuits.

3. In a telephone system, trunk circuits, control circuits common to said trunk circuits for controlling the establishment of connections to said trunk circuits, frames on which said trunk circuits are located, first connectors individual to said frames, means in said control circuit for selecting one of said first connectors and for selectively operating said selected connector to connect said control circuit with one of said trunk circuits, a service observing circuit, a second connector for connecting said service observing circuit with said trunk circuits, means responsive to the connection of one of said control circuits with of of said trunk circuits to initiate the operation of said second connector to connect said service observing circuit with said one trunk circuit, means in said second connector to identify the frame and trunk selected by said control circuit and means under the control of said identifying means to connect said service observing equipment with said identified trunk.

4. In a telephone system, trunk circuits, control circuits common to said trunk circuits for controlling the establishment of connections to said trunk circuits, frames on which said trunk circuits are located, first connectors individual to said frames, means in said control circuits for selecting one of said first connectors and for selectively operating said selected connector to connect said control circuit with one of said trunk circuits, a service observing circuit, a second connector for connecting said service observing circuit with said trunk circuits, means responsive to the connection of one of said control circuits with one of said trunk circuits to initiate the operation of said second connector to connect said service observing circuit with said one trunk circuit, means in said second connector to identify a plurality of selected frames, preference means for selecting one of said identified frames, means to identify the selected trunk on said selected frame and means to connect said service observing circuit with said identified trunk.

5. In a telephone system, trunk circuits of a plurality of classes, control equipment common to said trunk circuits, means for connecting said control equipment with one of said trunk circuits to control the establishment of a telephone connection thereover, service observing equipment, an observing connector for connecting said service observing equipment with said trunks, a service observing operator's position, a service observing trunk connecting said service observing equipment with said service observing operator's position, first trunk class indicating means in said service observing equipment selectively operable over said observing trunk under the control of said position to indicate to said observing equipment the class of trunk on which said position is prepared to observe, means jointly controlled by the connection of a control circuit with one of said trunks and said first trunk class indicating means to operate said observing connector to connect said one trunk with said service observing equipment, second trunk class indicating means in said control circuit operated in accordance with the class of said one trunk circuit and means under the joint control of said first class indicating means and said second class indicating means to connect said service observing operator's position with said one trunk circuit.

6. In a telephone system, arranged for service observing as set forth in claim 5, means normally responsive to the operation of said observing connector to transmit a start signal to said observing position to cause said position to be connected with said one trunk circuit and means under the control of said control equipment to prevent the transmission of said start signal to said observing position.

7. In a telephone system, arranged for service observing as set forth in claim 5, means normally responsive to the operation of said observing connector to transmit a start signal to said observing position to cause said position to be connected with said one trunk circuit and means under the control of said control equipment to prevent the transmission of said start signal to said observing position and to release said observing connector.

8. In a telephone system, arranged for service observing as set forth in claim 5, means to mark said position as busy or idle, means in said service observing equipment to indicate whether said position is busy or idle, means under the control of said marking means to transmit a signal over said service observing trunk to operate said indicating means in said service observing equipment and means under the control of said indicating means when said position is marked busy to disable said observing connector.

9. In a telephone ssytem, trunk circuits, control circuits common to said trunk circuits, means in said control circuits for registering telephone designations, means under the control of said registering means for selecting one of said trunk circuits, a service observing circuit, a service observing operator's position, a service observing trunk connecting said service observing circuit with said service observing operator's position, means responsive to the selection of one of said trunk circuits by said common control circuit to connect said service observing circuit with said selected trunk circuit, a register individual to said service observing circuit, means for connecting said register with said control circuit, means to operate said register in accordance with the designation registered in said control circuit and means individual to said register for transmitting said designation to said service observing operator's position.

10. In a telephone system, trunk circuits of a plurality of classes, control circuits common to said trunk circuits, means in said control circuits for registering telephone designations, means under the control of said registering means for selecting one of said trunk circuits, first class indicating means operated under the control of said registering means for indicating the class of said selected trunk, a service observing circuit, a service observing operator's position, a service observing trunk connecting said service observing circuit with said service observing operator's position, second class indicating means in said service observing circuit operated by said observing position to indicate the class of trunk on which the position is prepared to observe, means responsive to the selection of one of said trunk circuits by said common control circuit to connect said service observing circuit with said selected trunk circuit, a register individual to said service observing circuit, means under the joint control of said first class indicating means and said second class indicating means for connecting said register wtih said control circuit, means to operate said register in accordance with the designation registered in said control circuit and means individual to said register for transmitting said designation to said service observing operator's position.

11. In a telephone system, trunk circuits of a plurality of classes, control circuits common to said trunk circuits, means in said control circuits for registering telephone designations, means under the control of said registering means for selecting one of said trunk circuits, first class indicating means operated under the control of said registering means for indicating the class of said selected trunk, a service observing circuit, a service observing operator's position, a service observing trunk connecting said service observing circuit with said service observing operator's position, second class indicating means in said service observing circuit operated by said observing position to indicate the class of trunk on which the position is prepared to observe, means responsive to the selection of one of said trunk circuits by said common control circuit to connect said service observing circuit with said selected trunk circuit, a register individual to said service observing circuit, means under the joint control of said first class indicating means and said second class indicating means effective if said first class indicating means and said second class indicating means indicate the same class for connecting said register with said control circuit, means to operate said register in accordance with the designation registered in said control circuit and means individual to said register for transmitting said designation to said service observing operator's position.

12. In a telephone system, trunk circuits, control circuits common to said trunk circuits, means in said control circuits for registering telephone designations, means under the control of said registering means for selecting one of said trunk circuits, a sender, means for connecting said sender with said connected trunk circuit, a service observing circuit, a service observing operator's position, a service observing trunk connecting said service observing circuit with said service observing operator's position, means responsive to the selection of one of said trunk circuits by said common control circuit to connect said service observing circuit with said selected trunk circuit, indicating means in said service observing circuit operated when said sender is connected with said trunk circuit, a register individual to said service observing circuit, means for connecting said register with said control circuit, means to operate said register in accordance with the designation registered in said control circuit, means individual to said register for transmitting said designation to said service observing operator's position, and means responsive to the release of said indicating means to initiate the operation of said designation transmitting means.

13. In a telephone system, trunk circuits of a plurality of classes, control circuits common to said trunk circuits, means in said control circuits for registering telephone designations, means under the control of said registering means for selecting one of said trunk circuits, first class indicating means operated under the control of said registering means for indicating the class of said selected trunk, a sender, means for connecting said sender with said connected trunk circuit, a service observing circuit, a service observing operator's position, a service observing trunk connecting said service observing circuit with said service observing operator's position, second class indicating means in said service observing circuit operated by said observing position to indicate the class of trunk on which the position is prepared to observe, means responsive to the selection of one of said trunk circuits by said common control circuit to connect said service observing circuit with said selected trunk circuit, indicating means in said service observing circuit operated when said sender is connected with said trunk circuit, a register individual to said service observing circuit, means under the joint control of said first class indicating means and said second class indicating means for connecting said register with said control circuit, means to operate said register in accordance with the designation registered in said control circuit, means individual to said register for transmitting said designation to said service observing operator's position, and means responsive to the release of said indicating means to initiate the operation of said designation transmitting means.

14. In a telephone system, trunk circuits of a plurality of classes, control circuits common to said trunk circuits, means in said control circuits for registering telephone designations, means under the control of said registering means for selecting one of said trunk circuits, first class indicating means operated under the control of said registering means for indicating the class of said selected trunk, a sender, means for connecting said sender with said connected trunk circuit, a service observing circuit, a service observing operator's position, a service observing trunk connecting said service observing circuit with said service observing operator's position, second class indicating means in said service observing circuit operated by said observing position to indicate the class of trunk on which the position is prepared to observe, means responsive to the selection of one of said trunk circuits by said common control circuit to connect said service observing circuit with said selected trunk circuit, indicating means in said service observing circuit operated when said sender is connected with said trunk circuit, a register individual to said service observing circuit, means under the joint control of said first class indicating means and said second class indicating means for connecting said register with said control circuit, means to operate said register in accordance with the designation registered in said control circuit, means individual to said register for transmitting said designation to said service observing operator's position, and means responsive to the release of said indicating means to initiate the operation of said designation transmitting means.

15. In a telephone system, calling lines, trunk circuits, control circuits common to said trunk circuits, means in said control circuits for registering telephone designations under the control of one of said calling lines, means under the control of said registering means for selecting one of said trunk circuits and establishing a telephone connection including said one calling line and said selected trunk circuit, supervisory means in said trunk circuit operated under the control of said calling line, a service observing circuit, a service observing operator's position, a service observing trunk connecting said service observing circuit with said service observing operator's position, means responsive to the selection of one of said trunk circuits by said common control circuit to connect said service observing circuit with said selected trunk circuit, means in said service observing circuit responsive to the operation and release of said supervisory means to transmit corresponding signals to said service observing operator's position, and means responsive to the release of said supervisory means to delay the transmission of the corresponding signal to said service observing operator's position.

16. In a telephone system, calling lines, trunk circuits, control circuits common to said trunk circuits, means in said control circuits for registering telephone designations under the control of one of said calling lines, means under the control of said registering means for selecting one of said trunk circuits and establishing a telephone connection including said one calling line and said connected trunk circuit, supervisory means in said trunk circuit operated under the control of said calling line, the release of said supervisory means by said calling line normally effective to release said telephone connection, a service observing circuit, a service observing operator's position, a service observing trunk connecting said service observing circuit with said service observing operator's position, means responsive to the selection of one of said trunk circuits by said common control circuit to connect said service observing circuit with said selected trunk circuit, means in said service observing circuit responsive to the operation and release of said supervisory means to transmit corresponding signals to said service observing operator's position, timing means responsive to the release of said supervisory means, and means under the control of said timing means to prevent the release of said telephone connection.

17. In a telephone system, calling lines, trunk circuits, control circuits common to said trunk circuits, means in said control circuits for registering telephone designations under the control of one of said calling lines, means under the control of said registering means for selecting one of said trunk circuits and establishing a telephone connection including said one calling line and said connected trunk circuit, supervisory means in said trunk circuit operated under the control of said calling line, the release of said supervisory means by said calling line normally effective to release said telephone connection, a service observing circuit, a service observing operator's position, a service observing trunk connecting said service observing circuit with said service observing operator's position, means responsive to the selection of one of said trunk circuits by said common control circuit to connect said service observing circuit with said selected trunk circuit, means in said service observing circuit responsive to the operation and release of said supervisory means to transmit corresponding signals to said service observing operator's position, timing means responsive to the release of said supervisory means, and means under the control of said timing means to delay the transmission of the corresponding signal to said service observing operator's position and to prevent the release of said telephone connection.

References Cited in the file of this patent

UNITED STATES PATENTS

| | | |
|---|---|---|
| 2,017,644 | Allen et al. | Oct. 15, 1935 |
| 2,709,722 | Rosene | May 31, 1955 |